United States Patent
Seiler

(10) Patent No.: US 11,862,128 B2
(45) Date of Patent: *Jan. 2, 2024

(54) SYSTEMS AND METHODS FOR FOVEATED RENDERING

(71) Applicant: Meta Platforms Technologies, LLC, Menlo Park, CA (US)

(72) Inventor: Larry Seiler, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/377,288

(22) Filed: Jul. 15, 2021

(65) Prior Publication Data

US 2021/0343261 A1 Nov. 4, 2021

Related U.S. Application Data

(63) Continuation of application No. 16/539,724, filed on Aug. 13, 2019, now Pat. No. 11,100,899.

(51) Int. Cl.
*G09G 5/37* (2006.01)
*G06F 3/01* (2006.01)
(Continued)

(52) U.S. Cl.
CPC .............. *G09G 5/37* (2013.01); *G06F 3/013* (2013.01); *G06T 1/20* (2013.01); *G06T 5/003* (2013.01);
(Continued)

(58) Field of Classification Search
CPC . G06T 1/20; G06T 15/06; G06T 2207/20192; G06T 5/003; G09G 2320/0261; G09G 2320/0686; G09G 2340/0435; G09G 2354/00; G09G 5/02; G09G 5/37; H04N 13/106; H04N 13/344; H04N 13/366; H04N 13/398
See application file for complete search history.

(56) References Cited

U.S. PATENT DOCUMENTS

| H1812 H | * | 11/1999 | Arcuri | ..................... G06T 11/40 345/428 |
| 8,897,359 B2 | * | 11/2014 | Regunathan | ......... H04N 19/463 375/240.03 |

(Continued)

*Primary Examiner* — Sing-Wai Wu
(74) *Attorney, Agent, or Firm* — Baker Botts L.L.P.

(57) ABSTRACT

In one embodiment, a computing system may determine a focus point of a viewer based on received sensor data. The system may determine, for a current frame, a first viewing region encompassing a focus point of the viewer and a second view region excluding the first viewing region. The system may determine, for the current frame, color values for the first viewing region using respective first sampling resolutions, and color values for the second viewing region using respective second sampling resolutions. At least one second sampling resolution may be lower than a corresponding first sampling resolution associated with a same color channel. At least two of the second sampling resolutions for the color channels of the second viewing region may be different from each other. The system may output the color values for the first viewing region and the second viewing region of the current frame for display.

19 Claims, 14 Drawing Sheets

(51) Int. Cl.
*G06T 1/20* (2006.01)
*G06T 5/00* (2006.01)
*G06T 15/06* (2011.01)
*G09G 5/02* (2006.01)

(52) U.S. Cl.
CPC ............... *G06T 15/06* (2013.01); *G09G 5/02* (2013.01); *G06T 2207/20192* (2013.01); *G09G 2320/0261* (2013.01); *G09G 2320/0686* (2013.01); *G09G 2340/0435* (2013.01); *G09G 2354/00* (2013.01)

(56) References Cited

U.S. PATENT DOCUMENTS

| | | | |
|---|---|---|---|
| 2003/0112863 A1* | 6/2003 | Demos | G06T 9/007 375/E7.14 |
| 2017/0236466 A1* | 8/2017 | Spitzer | G09G 3/3266 345/560 |
| 2018/0262758 A1* | 9/2018 | El-Ghoroury | H04N 13/344 |

* cited by examiner

Green Pixel Array 320

| Green Pixel [0, 3] | Green Pixel [1, 3] | Green Pixel [2, 3] | Green Pixel [3, 3] |
|---|---|---|---|
| Green Pixel [0, 2] | Green Pixel [1, 2] | Green Pixel [2, 2] | Green Pixel [3, 2] |
| Green Pixel [0, 1] | Green Pixel [1, 1] | Green Pixel [2, 1] | Green Pixel [3, 1] |
| Green Pixel [0, 0] | Green Pixel [1, 0] | Green Pixel [2, 0] | Green Pixel [3, 0] |

Blue Pixel Array 340

| Blue Pixel [0, 3] | Blue Pixel [1, 3] | Blue Pixel [2, 3] | Blue Pixel [3, 3] |
|---|---|---|---|
| Blue Pixel [0, 2] | Blue Pixel [1, 2] | Blue Pixel [2, 2] | Blue Pixel [3, 2] |
| Blue Pixel [0, 1] | Blue Pixel [1, 1] | Blue Pixel [2, 1] | Blue Pixel [3, 1] |
| Blue Pixel [0, 0] | Blue Pixel [1, 0] | Blue Pixel [2, 0] | Blue Pixel [3, 0] |

Red Pixel Array 330

| Red Pixel [0, 3] | Red Pixel [1, 3] | Red Pixel [2, 3] | Red Pixel [3, 3] |
|---|---|---|---|
| Red Pixel [0, 2] | Red Pixel [1, 2] | Red Pixel [2, 2] | Red Pixel [3, 2] |
| Red Pixel [0, 1] | Red Pixel [1, 1] | Red Pixel [2, 1] | Red Pixel [3, 1] |
| Red Pixel [0, 0] | Red Pixel [1, 0] | Red Pixel [2, 0] | Red Pixel [3, 0] |

| | Sampling Resolution per Color Channel | | | Reduction Rate |
|---|---|---|---|---|
| | Green | Red | Blue | |
| 1st Region | Full | Full | Full | 1 |
| 2nd Region | Full | 1/2 | 1/2 | 1/2 |
| 3rd Region | 1/2 | 1/2 | 1/2 | 1/4 |
| 4th Region | 1/2 | 1/4 | 1/4 | 1/8 |
| ... | ... | ... | ... | ... |

| | Sampling Resolution per Color Channel | | | Reduction Rate | Area Ratio | Area Ratio × Reduction Rate |
|---|---|---|---|---|---|---|
| | Green | Red | Red | | | |
| 1st Region | Full | Full | Full | 1 | 1/16 | 1/16 |
| 2nd Region | Full | 1/2 | 1/2 | 1/2 | 3/16 | 3/32 |
| 3rd Region | 1/2 | 1/2 | 1/2 | 1/4 | 3/4 | 3/16 |
| Sum of All Display Regions | | | | | 1 | 11/32 |

| | | | |
|---|---|---|---|
| RGB Pixel Tile 411 | RGB Pixel Tile 412 | RGB Pixel Tile 413 | RGB Pixel Tile 414 |
| RGB Pixel Tile 421 | RGB Pixel Tile 422 | RGB Pixel Tile 423 | RGB Pixel Tile 424 |
| RGB Pixel Tile 431 | RGB Pixel Tile 432 | RGB Pixel Tile 433 | RGB Pixel Tile 434 |
| RGB Pixel Tile 441 | RGB Pixel Tile 442 | RGB Pixel Tile 443 | RGB Pixel Tile 444 |

Area 401 points to the top-left block (411, 412, 421, 422).

400C

| | | | |
|---|---|---|---|
| RGB Pixel Tile 411 | RGB Pixel Tile 412 | RGB Pixel Tile 413 | RGB Pixel Tile 414 |
| RGB Pixel Tile 421 | RGB Pixel Tile 422 | RGB Pixel Tile 423 | RGB Pixel Tile 424 |
| RGB Pixel Tile 431 | RGB Pixel Tile 432 | RGB Pixel Tile 433 | RGB Pixel Tile 434 |
| RGB Pixel Tile 441 | RGB Pixel Tile 442 | RGB Pixel Tile 443 | RGB Pixel Tile 444 |

Area 402 indicates tiles 411–414 and 421–424.

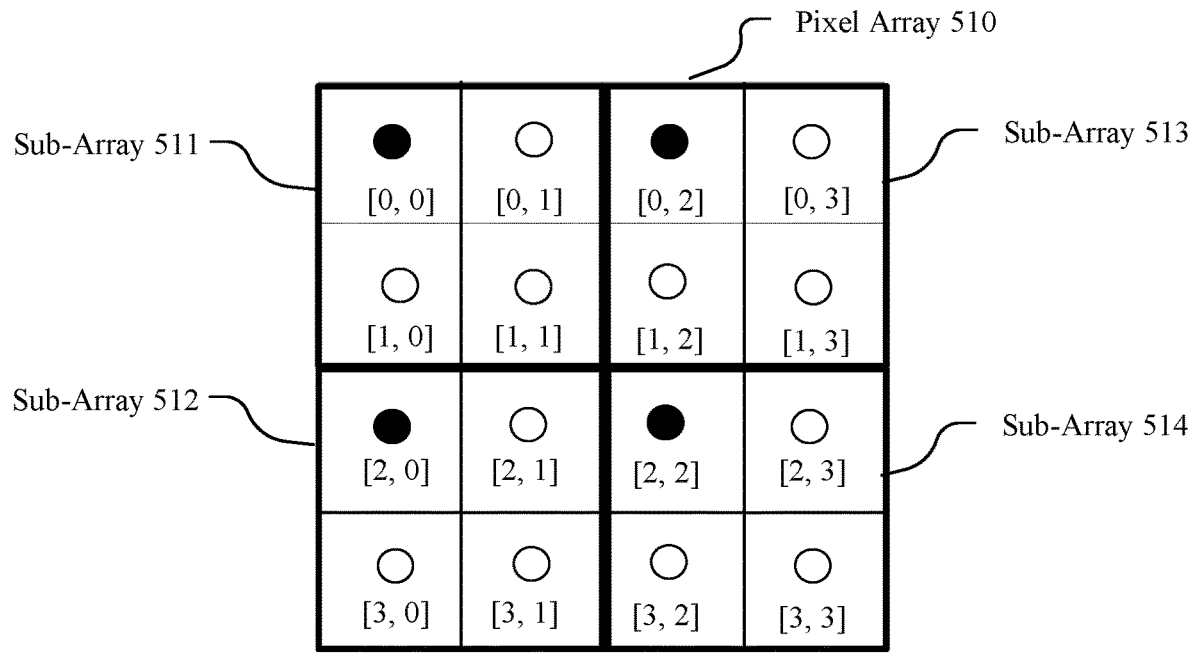
*FIG. 5A*
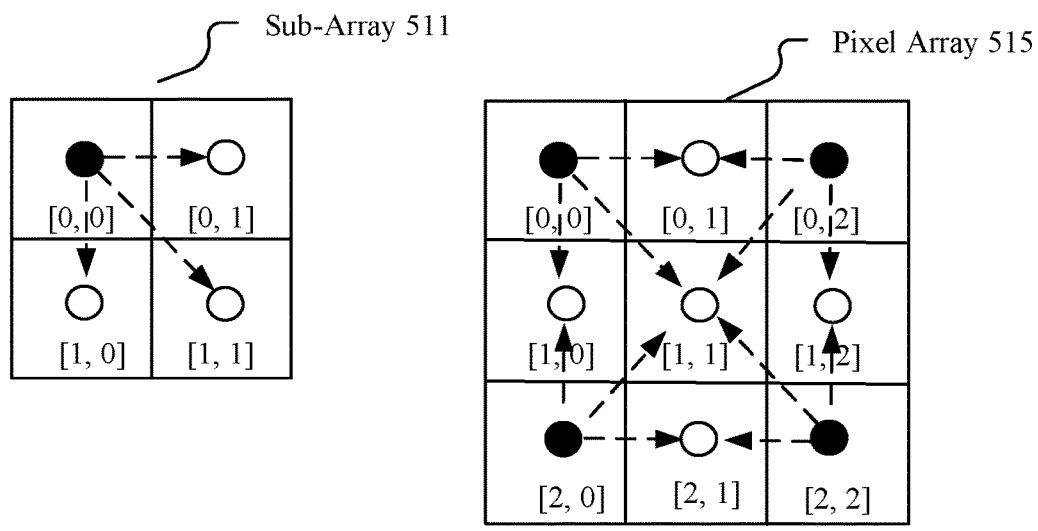
*FIG. 5B*
*FIG. 5C*

SYSTEMS AND METHODS FOR FOVEATED RENDERING

PRIORITY

This application is a continuation under 35 U.S.C. § 120 of U.S. patent application Ser. No. 16/539,724, filed 13 Aug. 2019, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for rendering display content with variable resolutions across different display regions of the display based on the foveal region of the user to reduce the power consumption and computational resources usage of the rendering process. The system may determine, for the display, a number of display regions based on their distances to the user's gazing point on the display and render display content with different resolutions in different display regions. For example, the system may determine: a first display region with ¼ width and ¼ height of the full display area and centered at the user's gazing point (which may be determined based on the most up-to-date eye position); a second display region with ½ width and ½ height of the full display area and surrounding but excluding the first display region; and a third display region corresponding to the remaining display area of the display. Then, the system may independently determine a sampling resolution for each of the three color channels (e.g., RGB) of different display regions. For example, the system may use a full sampling resolution for all three color channels of the first display region and use reduced sampling resolutions for the second and third display regions (e.g., full resolution for Green color channel and half resolution for Red and Blue color channels in the second display region; half resolution for Green color channel and quarter resolution for Red and Blue color channels in the third display region).

In particular embodiments, the system may cast fewer rays for determining tile/surface pair for the display content with reduced resolutions. For example, the system may use a full resolution for Green color channel and use a half resolution for Red or Blue color channels. As a result, the system may need to cast a ray for each Green pixel and need to cast only one ray for every four Red or Blue pixels (instead four rays for four Red pixels and four rays for four Blue pixels). As such, the system would only need to cast a total of six rays for a four-pixel region (one for Red, one for Blue, and four for Green), rather than twelve. Therefore, the system would only need half the memory reading bandwidth and half the number of computational units (e.g., filter blocks). The system may retrieve texture data (e.g., MIP map texture data) for the tile/surface pairs for determining the color values for the display content. Since less data needs to be processed, the system could use the same amount of resources (e.g., filters, memory, computational units) to process twice as many half-resolution pixels as full-resolution pixels in a given clock cycle because of the reduced texture memory reading and data processing. In particular embodiments, after the color values have been determined, the system may need less transmission bandwidth to send the color values to the backplane of the display because of the reduced pixel density. In particular embodiments, the system may generate the color values that are not independently computed due to foveated filtering in several different ways: (1) by interpolating neighboring color values prior to brightness correction and dithering; (2) by interpolating neighboring color values after transmitting them to display; or (3) by replicating neighboring color values in the display.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a method may comprise, by a computing system:
accessing a first rendered frame generated at a first frame rate;
generating, based on the first rendered frame, subframes at a second frame rate higher than the first frame rate, wherein a first subframe of the subframes is generated by:
determining a viewing direction of the user based on sensor data;
determining, based on the viewing direction, at least a first viewing region encompassing a foveal focus point of the user and a second viewing region excluding the first viewing region;
determining, for the first subframe, color values corresponding to the first viewing region using a first sampling resolution and color values corresponding to the second viewing region using a second sampling resolution lower than the first sampling resolution; and
outputting the subframes for display at the second frame rate.

In an embodiment, the first subframe may be generated by a graphic pipeline comprising a transform block and a pixel block, and a method may comprise:
determining, by the transform block, a plurality of tile-surface pairs by casting a plurality of rays to a plurality of surfaces for determining intersections between the plurality of tiles and the plurality of surfaces, wherein the color values corresponding to the first and second viewing regions are determined based on the plurality of tile-surface pairs.

The transform block may cast fewer rays for determining the color values corresponding to the second viewing region than the color values corresponding to the first viewing region.

In an embodiment, a method may comprise:
determining, by the pixel block, the color values corresponding to the first viewing region by sampling a first set of surfaces using the first sampling resolution; and
determining, by the pixel block, the color values corresponding to the second viewing region by sampling a second set of surfaces using the second sampling resolution, wherein the pixel block performs a smaller amount of computation for determining the color values corresponding to the second sample view viewing region than the color values corresponding to the first viewing region.

A first color channel of a group of pixels corresponding to the second viewing region may be associated with the second sampling resolution, and a second color channel of the group of pixels corresponding to the second viewing region may be associated with a third sampling resolution different from the second sampling resolution.

In an embodiment, a method may comprise:
independently determining a grayscale value for each n×n pixel array of the first color channel of the group of pixels corresponding to the second viewing region, wherein a value of n is determined based on the second sampling resolution; and
independently determining a grayscale value for each m×m pixels of a second color channel of the group of pixels corresponding to the second viewing region, wherein a value of m is determined based on the third resolution associated with the second color channel.

The second sampling resolution of the first color channel and the third sampling resolution of the second color channel may have a relationship of powers of two.

In an embodiment, a method may comprise:
determining a grayscale value for each pixel within the n×n pixel array based on a replication process, wherein the replication process is performed by a display system.

In an embodiment, a method may comprise:
determining a grayscale value for each pixel within the n×n pixel array based on an interpolation process, wherein the interpolation process is performed by a display block of the graphic pipeline prior to a brightness correction process and a dithering process.

In an embodiment, a method may comprise:
determining a third viewing region excluding the first viewing region and the second viewing region, wherein respective color values of the first viewing region, the second viewing region, and the third viewing region are determined based on a gradually lower sampling resolution.

In an embodiment, the first subframe may be generated based on a source data, and a method may comprise:
pre-processing the source data at a successively lower resolution for generating the first subframe; and
accessing the source data at the successively lower resolution while generating the first subframe.

In an embodiment, a method may comprise:
applying a sharpness filter to a plurality of pixels corresponding to the second viewing region, wherein the first subframe preserves a contrast level on one or more edges associated with one or more objects in the second viewing region.

In an embodiment, a method may comprise:
applying a sharpness filter to a plurality of pixels of the first subframe in the second viewing region, wherein the first subframe preserves an average brightness in the second viewing region.

The first frame rate may be within a first range of 30-90 Hz, and the second frame rate may be within a second range of 1-2 kHz.

In an embodiment, one or more computer-readable non-transitory storage media may embody software that is operable when executed to:
access a first rendered frame generated at a first frame rate;
generate, based on the first rendered frame, subframes at a second frame rate higher than the first frame rate, wherein a first subframe of the subframes is generated by:
determining a viewing direction of the user based on sensor data;
determining, based on the viewing direction, at least a first viewing region encompassing a foveal focus point of the user and a second viewing region excluding the first viewing region;
determining, for the first subframe, color values corresponding to the first viewing region using a first sampling resolution and color values corresponding to the second viewing region using a second sampling resolution lower than the first sampling resolution; and
output the subframes for display at the second frame rate.

In an embodiment, the first subframe image may be generated using a graphic pipeline comprising a transform block and a pixel block, and the software may be operable when executed to:

determine, by the transform block, a plurality of tile-surface pairs by casting a plurality of rays to a plurality of surfaces for determining intersections between the plurality of tiles and the plurality of surfaces, wherein the color values corresponding to the first and second viewing regions are determined based on the plurality of tile-surface pairs.

The transform block may cast fewer rays for determining the color values corresponding to the first viewing region than the color values corresponding to the second viewing region.

In an embodiment, a system may comprise: one or more processors; and one or more computer-readable non-transitory storage media coupled to one or more of the processors and comprising instructions operable when executed by one or more of the processors to cause the system to:

access a first rendered frame generated at a first frame rate;

generate, based on the first rendered frame, subframes at a second frame rate higher than the first frame rate, wherein a first subframe of the subframes is generated by:

determining a viewing direction of the user based on sensor data;

determining, based on the viewing direction, at least a first viewing region encompassing a foveal focus point of the user and a second viewing region excluding the first viewing region;

determining, for the first subframe, color values corresponding to the first viewing region using a first sampling resolution and color values corresponding to the second viewing region using a second sampling resolution lower than the first sampling resolution; and output the subframes for display at the second frame rate.

In an embodiment, the first subframe image may be generated using a graphic pipeline comprising a transform block and a pixel block, and the instructions may be operable when executed by one or more of the processors to cause the system to:

determine, by the transform block, a plurality of tile-surface pairs by casting a plurality of rays to a plurality of surfaces for determining intersections between the plurality of tiles and the plurality of surfaces, wherein the color values corresponding to the first and second viewing regions are determined based on the plurality of tile-surface pairs.

The transform block may cast fewer rays for determining the color values corresponding to the first viewing region than the color values corresponding to the second viewing region.

BRIEF DESCRIPTION OF THE DRAWINGS

FIG. 3B illustrates three example pixel arrays for three color channels of Red, Green, and Blue.

FIG. 3C illustrates an example scheme for determining sampling resolutions of different color channels and different display regions.

FIG. 3D illustrates an example scheme using different sampling resolutions for different color channels and different display regions to reduce the amount of computation.

FIGS. 5A-5C illustrate an example replication process and interpolation process for determining grayscale values for the pixels within a pixel sub-array.

DESCRIPTION OF EXAMPLE EMBODIMENTS

AR/VR system may have limited available power (e.g., powered by battery) and limited computational resources (e.g., computational units, memory, data transmission bandwidth, etc.). However, graphic rendering processes for full resolution display content could be demanding on both power consumption and computational resources, and therefore could negatively impact the performance of the AR/VR system. Particular embodiments may use a foveated rendering process to reduce the power consumption and computational resources usage related to the display content rendering processes. For example, the system may render display content with full resolution (for all color channels of Red, Green, and Blue) in a foveal region corresponding to the user's gazing point and render display content with reduced resolutions (for one or more color channels) in the display regions beyond the user's foveal region. By using the foveated rendering process, the system may cast fewer rays for determining tile/surface pairs for the display content with reduced resolutions, and therefore use less computational resources for the rendering processes. The system may process a larger image area (e.g., a larger number of pixel or pixel tiles) in a given clock cycle using the same amount the computational resources as for processing full resolution image because of the reduced memory reading and data processing, and therefore improve the efficiency of the system performance. Furthermore, the system may need less transmission bandwidth for sending the pixel values to the display because of the reduced resolution in at least a portion of the foveated image.

Figure 1A:
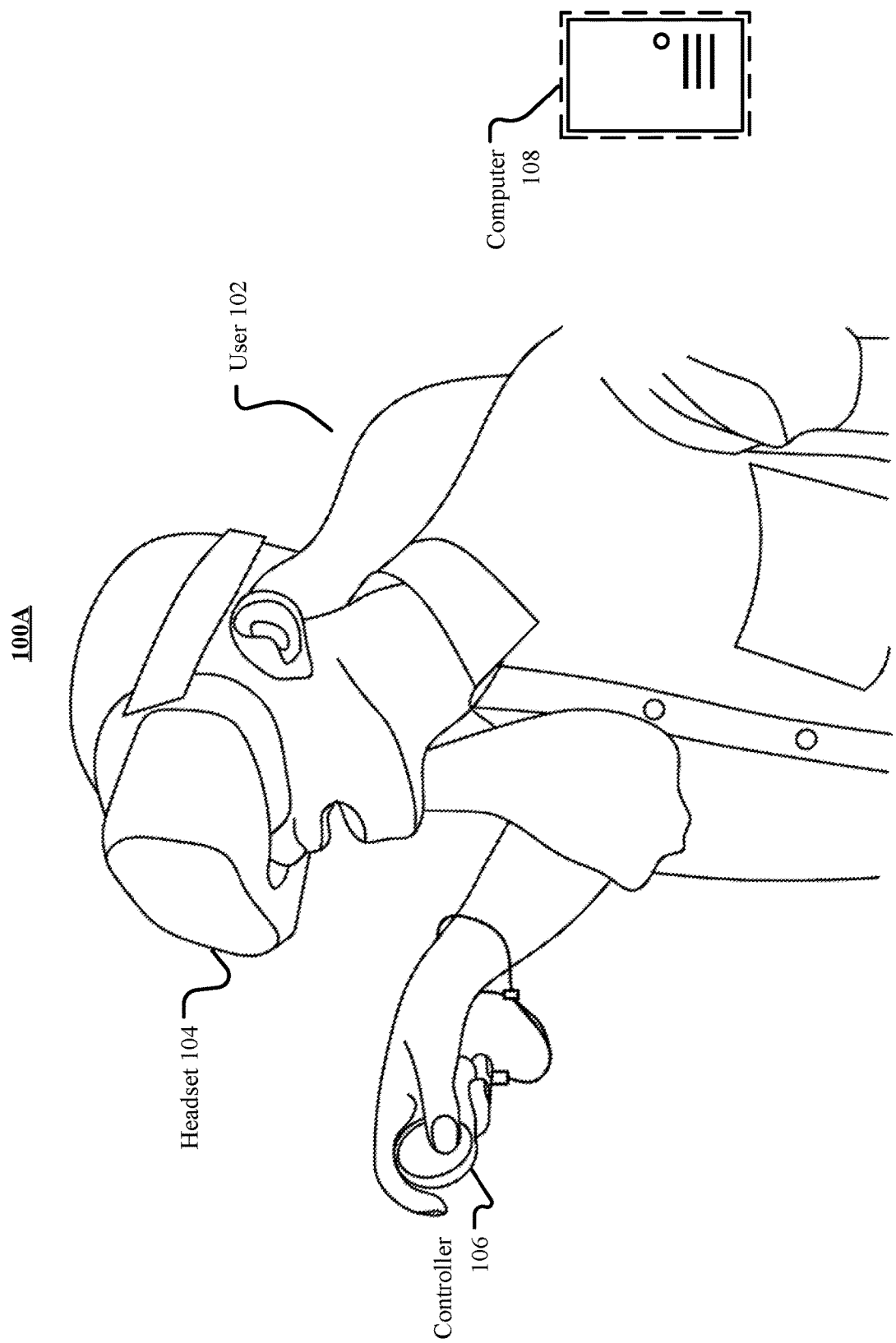
FIG. 1A illustrates an example artificial reality system.

FIG. 1A illustrates an example artificial reality system 100A. In particular embodiments, the artificial reality system 100 may comprise a headset 104, a controller 106, and a computing system 108, etc. A user 102 may wear the headset 104 that could display visual artificial reality content to the user 102. The headset 104 may include an audio device that could provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
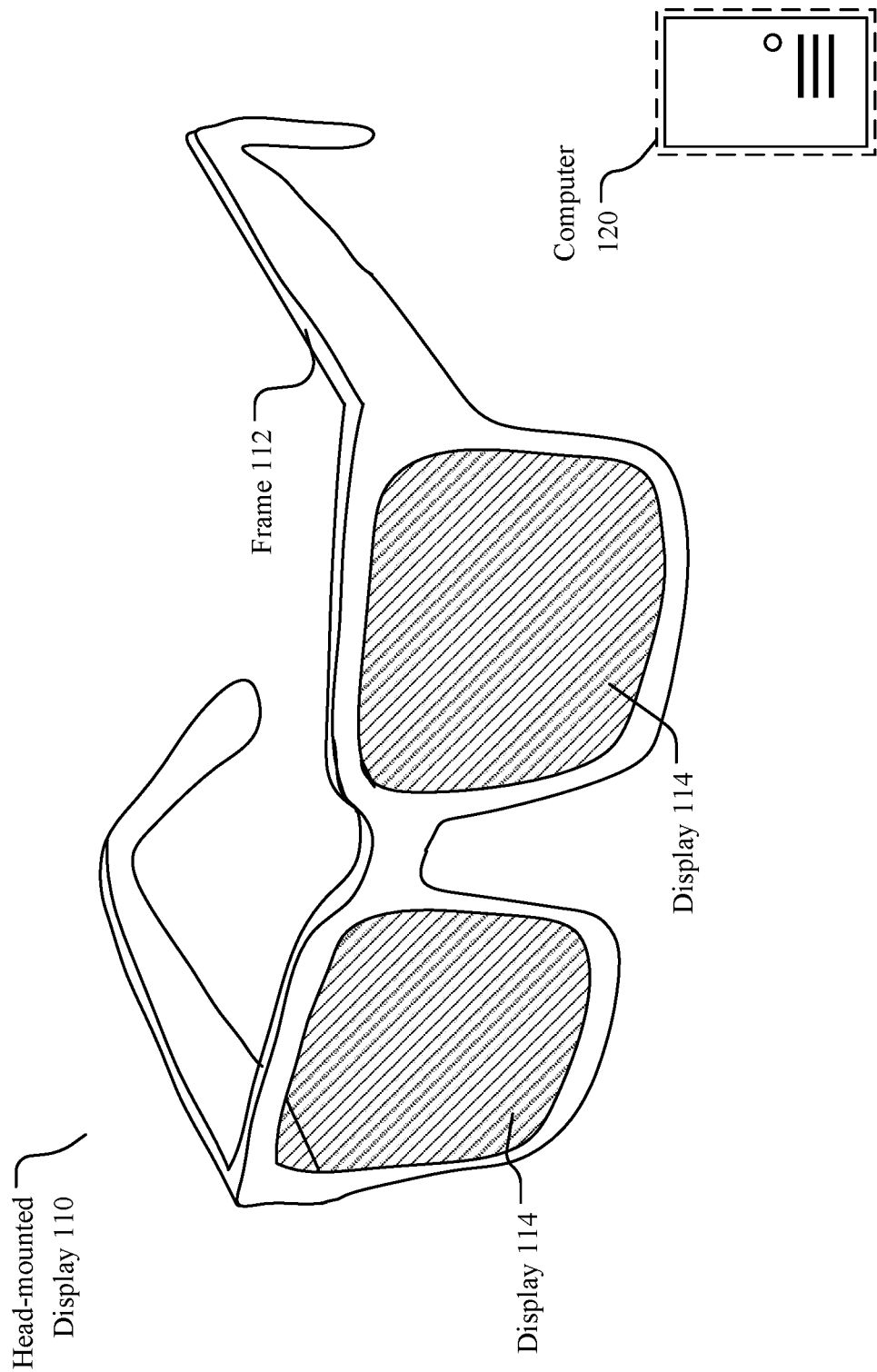
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2A:
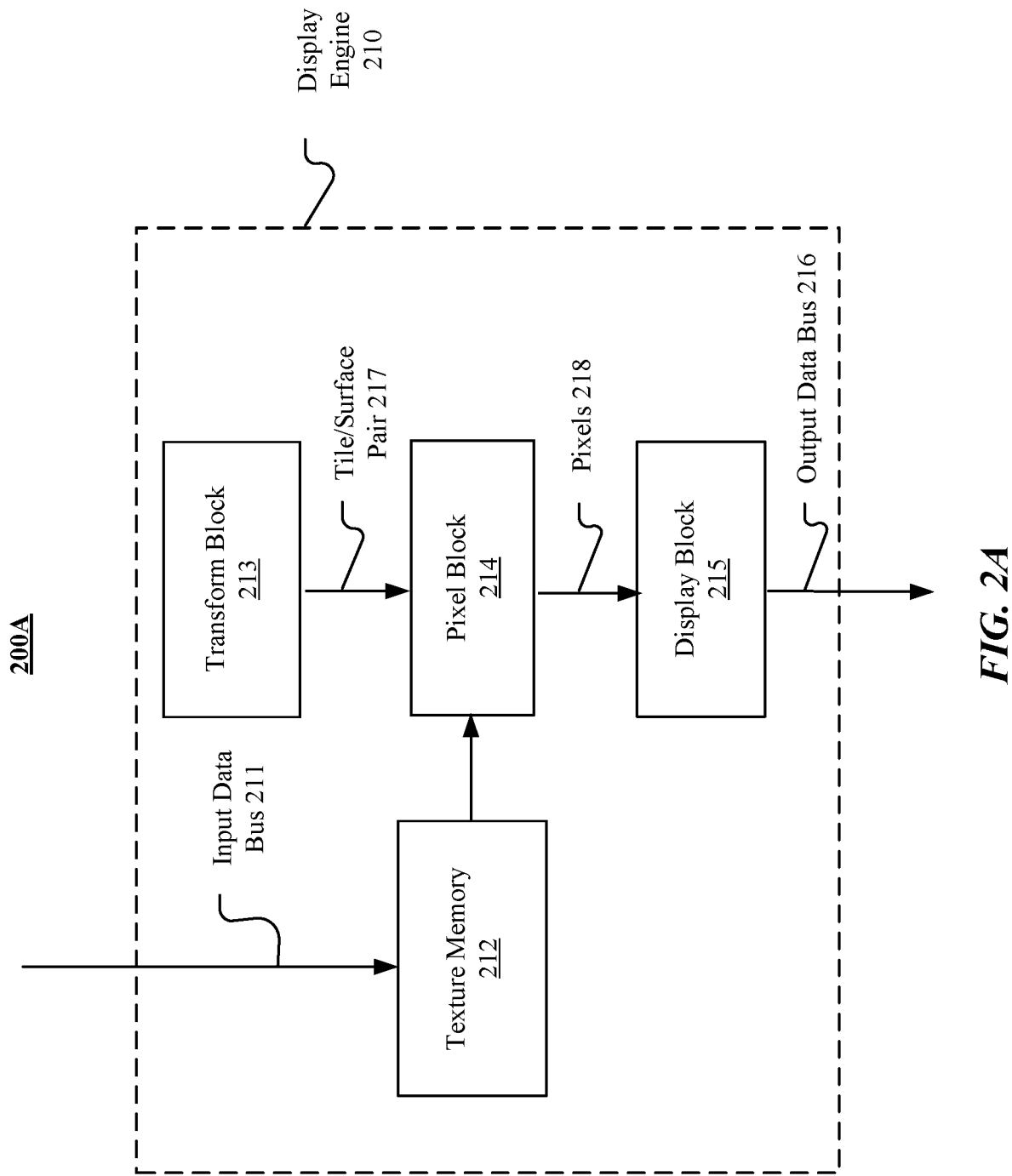
FIG. 2A illustrates an example architecture of a display engine.

FIG. 2A illustrates an example architecture 200 of a display engine 210. In particular embodiments, the processes and methods as described in this disclosure may be embodied or implemented within a display engine 210. The display engine 210 may include, for example, but is not limited to, a texture memory 212, a transform block 213, a pixel block 214, a display block 215, input data bus 211, output data bus 216, etc. In particular embodiments, the display engine 210 may include one or more graphic pipelines for generating images to be rendered on the display. For example, the display engine 210 may include two graphic pipelines for the user's left and right eyes. One of the graphic pipelines may include or may be implemented on the texture memory 212, the transform block 213, the pixel block 214, the display block 215, etc. The display engine 210 may include another set of transform block, pixel block, and display block for the other graphic pipeline. The graphic pipeline(s) may be controlled by a controller or control block (not shown) of the display engine 210. In particular embodiments, the texture memory 212 may be included within the control block or may be a memory unit external to the control block but local to the display engine 210. One or more of the components of the display engine 210 may be configured to communicate via a high-speed bus, shared memory, or any other suitable methods. This communication may include transmission of data as well as control signals, interrupts or/and other instructions. For example, the texture memory 212 may be configured to receive image data through the input data bus 211 and the display block 215 may send the pixel values to the display system through the output data bus 216.

In particular embodiments, the display engine 210 may include a controller block (not shown). The control block may receive data and control packages such as position data and surface information from controllers external to the display engine 210 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 212. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 210. The control block may initiate the graphic pipelines for processing one or more frames to be displayed. In particular embodiments, the graphic pipelines for the two eye display systems may each include a control block or share the same control block.

In particular embodiments, the transform block 213 may determine initial visibility information for surfaces to be displayed in the artificial reality scene. In general, the transform block 213 may cast rays from pixel locations on the screen and produce filter commands (e.g., filtering based on bilinear or other types of interpolation techniques) to send to the pixel block 214. The transform block 213 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 217 to send to the pixel block 214.

In particular embodiments, the transform block 213 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 213 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 214.

In particular embodiments, the pixel block 214 may determine color values or grayscale values for the pixels based on the tile-surface pairs. The color values for each pixel may be sampled from the texel data of surfaces received and stored in texture memory 212. The pixel block 214 may receive tile-surface pairs from the transform block 213 and may schedule bilinear filtering using one or more filer blocks. For each tile-surface pair, the pixel block 214 may sample color information for the pixels within the tile using color values corresponding to where the projected tile intersects the surface. The pixel block 214 may determine pixel values based on the retrieved texels (e.g., using bilinear interpolation). In particular embodiments, the pixel block 214 may process the red, green, and blue color components separately for each pixel. In particular embodiments, the display may include two pixel blocks for the two eye display systems. The two pixel blocks of the two eye display systems may work independently and in parallel with each other. The pixel block 214 may then output its color determinations to the display block 215. In particular embodiments, the pixel block 214 may composite two or more surfaces into one surface to when the two or more surfaces have overlapping areas. A composed surface may need less computational resources (e.g., computational units, memory, power, etc.) for the resampling process.

In particular embodiments, the display block 215 may receive pixel color values from the pixel block 214, covert the format of the data to be more suitable for the scanline output of the display, apply one or more brightness corrections to the pixel color values, and prepare the pixel color values for output to the display. In particular embodiments, the display block 215 may each include a row buffer and may process and store the pixel data received from the pixel block 214. The pixel data may be organized in quads (e.g., 2×2 pixels per quad) and tiles (e.g., 16×16 pixels per tile). The display block 215 may convert tile-order pixel color values generated by the pixel block 214 into scanline or row-order data, which may be required by the physical displays. The brightness corrections may include any required brightness correction, gamma mapping, and dithering. The display block 215 may output the corrected pixel color values directly to the driver of the physical display (e.g., pupil display) or may output the pixel values to a block external to the display engine 210 in a variety of formats. For example, the eye display systems of the headset system may include additional hardware or software to further customize backend color processing, to support a wider interface to the display, or to optimize display speed or fidelity.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 210 may also generate and store a scene graph that is a simplified form of the full application scene graph. The simplified scene graph may be used to specify the logical and/or spatial relationships between surfaces (e.g., the primitives rendered by the display engine 210, such as quadrilaterals or contours, defined in 3D space, that have corresponding textures generated based on the mainframe rendered by the application). Storing a scene graph allows the display engine 210 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 210 may also adjust for the geometric and color distortion introduced by the display subsystem and then composite the objects together to generate a frame. Storing a scene graph allows the display engine 210 to approximate the result of doing a full render at the desired high frame rate, while actually running the GPU or display engine 210 at a significantly lower rate.

Figure 2B:
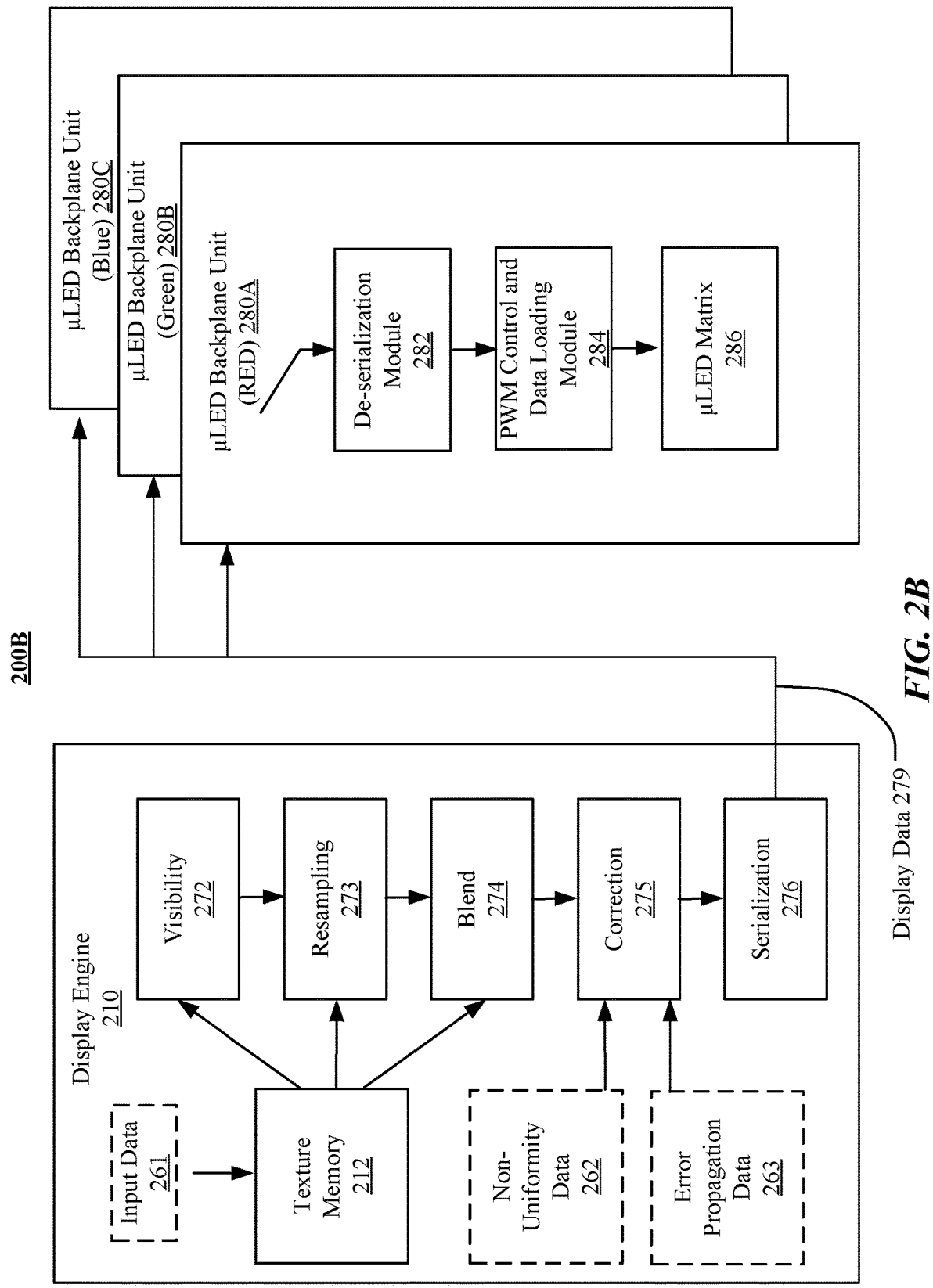
FIG. 2B illustrates an example graphic pipeline of the display engine for generating display image data.

FIG. 2B illustrates an example graphic pipeline 200B of the display engine 210 for generating display image data. In particular embodiments, the graphic pipeline 200B may include a visibility step 272, where the display engine 210 may determine the visibility of one or more surfaces received from the body wearable computing system. The visibility step 272 may be performed by the transform block (e.g., 213 in FIG. 2A) of the display engine 210. The display engine 210 may receive (e.g., by a control block or a controller) input data 261 from the body-wearable computing system. The input data 261 may include one or more surfaces, texel data, position data, RGB data, and rendering instructions from the body wearable computing system. The input data 261 may include mainframe images with 30-90 frames per second (FPS). The main frame image may have color depth of, for example, 24 bits per pixel. The display engine 210 may process and save the received input data 261 in the texel memory 212. The received data may be passed to the transform block 213 which may determine the visibility information for surfaces to be displayed. The transform block 213 may cast rays for pixel locations on the screen and produce filter commands (e.g., filtering based on bilinear or other types of interpolation techniques) to send to the pixel block 214. The transform block 213 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 214.

In particular embodiments, the graphic pipeline 200B may include a resampling step 273, where the display engine 210 may determine the color values from the tile-surfaces pairs to produce pixel color values. The resampling step 273 may be performed by the pixel block 214 in FIG. 2A) of the display engine 210. The pixel block 214 may receive tile-surface pairs from the transform block 213 and may schedule bilinear filtering. For each tile-surface pair, the pixel block 214 may sample color information for the pixels within the tile using color values corresponding to where the projected tile intersects the surface. The pixel block 214 may determine pixel values based on the retrieved texels (e.g., using bilinear interpolation) and output the determined pixel values to the respective display block 215.

In particular embodiments, the graphic pipeline 200B may include a bend step 274, a correction step 275, a serialization step 276, etc. In particular embodiments, the bend, correction and serialization steps of 274, 275, and 276 may be performed by the display block (e.g., 215 in FIG. 2A) of the display engine 210. The display engine 210 may blend the display content for display content rendering, apply one or more brightness corrections to the pixel color values, serialize the pixel values for scanline output for the physical display, and generate the display data 279 suitable for the μLED displays of the projectors. The display engine 210 may send the display data 279 to the μLED displays of the projectors. In particular embodiments, the system may include three μLED backplane units 280A, 280B, and 280C. Each μLED backplane unit of 280A, 280B, and 280C may include a de-serialization module 282, a PWM control and data loading module 284, and a μLED matrix 286. The display data 279 received from the display engine 210 may be de-serialized by the de-serialization module 282, loaded by the PWM control and data loading module 284, and displayed by the μLED matrix 286. In particular embodiments, the μLED display may run at 1-2 k subframes per second with 5 bits per pixel and may generate a data flow at 47 Gbps per color. The subframe images may be dithered (e.g., spatial or/and temporal dithering) to represent a color depth or grayscale of 8 bits.

Figure 2C:
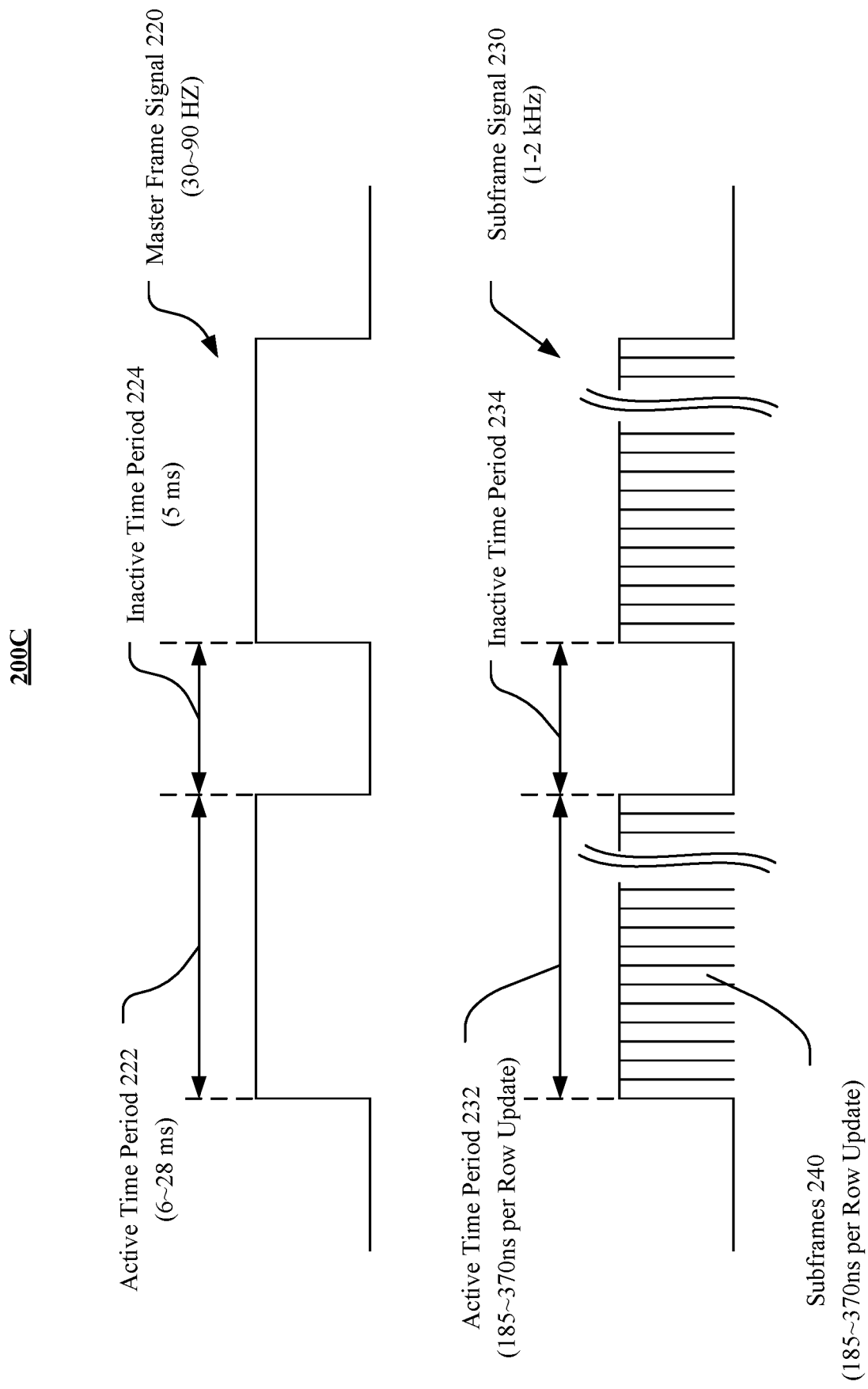
FIG. 2C illustrates an example scheme for rendering display content using a master-subframe mechanism.

FIG. 2C illustrates an example scheme 200C for rendering display content using a master-subframe mechanism. In particular embodiments, the system may adopt a master-subframe rendering mechanism for rendering display content. The display engine of the system may load mainframe image data including a series of mainframe images from a controller external to the display engine (e.g., a central controller coordinating multiple display engines of the AR/VR system or a body-wearable computing system, etc.). The mainframe images may be generated and loaded to the display engine at a master frame rate (e.g., 30-90 Hz). The display engine may use the graphic pipeline or localized transformative operations (e.g., 2D shifting, interpolation, compositing multiple surfaces into a single surfaces) to generate a series of subframe image at a subframe frame rate (e.g., 1-2 kHz) which could be higher than the master frame rate (e.g., 30-90 Hz). The display engine may render the subframe images to the physical display at the subframe frame rate. This master-subframe rendering mechanism may allow the display engine to render display content with high subframe rate (e.g., 1-2 kHz), and therefore to be more responsive (e.g., shorter responding time) to the user's head movement or eye movement.

As an example and not by way of limitation, the display engine may load the image data from the central control units (which are external to the display engine) of the wearable computing system into the texel memory and render display content to physical display based on a master frame clock signal 220 and a subframe clock signal 230, as illustrated in FIG. 2C. The master frame clock signal 220 may include periodical time periods including the active time period 222 and inactive time period 224. In particular embodiments, the active time period 222 of the master frame clock signal 220 may have a length in a range of 6 ms to 28 ms and the inactive time period 224 may have a length about 5 ms. Mainframe image data may be updated or loaded into the texture memory of the display engine during the inactive time periods 224 of the periodical master frame clock signal 220.

After being loaded or updated into the display engine, the mainframe image data may be stored within the texture memory of the display engine. The display engine may use the graphic pipeline (or one or more localized transformative operations) to generate display data for the physical display based on the mainframe image data. The display data for the physical display may include a number of subframe images which may be generated and rendered at the subframe rate of 1-2 kHz based on the subframe clock signal 230. The subframe clock signal 230 may include periodical time periods including the active time periods 232, which corresponds to the active time period 222 of the master frame clock signal 220, and the inactive time periods 234, which corresponds to the inactive time period 224 of the master frame clock signal 220. The display content including the subframes 240 may be rendered to the physical display during the active time periods 232 at a subframe rate of 1-2 kHz (e.g., 185-270 ns per row update). During the inactive time periods 234, the display engine may not render any subframes to the physical display but may perform other operations, for example, adjusting the varifocal lens mechanically, or/and one or more localized transformative operations, instead of rendering any subframes to the physical display. For the master-subframe rendering mechanism, the display engine may use the master frame rate for interfacing with up-stream modules (e.g., central control units of a wearable computing system) to receive mainframe images and render the subframe with a higher subframe rate to the physical display. The display engine can replay multiple frames and perform transformation or operations (e.g., color correction) on the subframes to generate display rendering results with a higher brightness, longer persistence, or/and improved bit depth.

In particular embodiments, the system may generate and render subframe images with a high frame rate (e.g., 1-2 kHz) to allow the display content (e.g., scene at particular view angle) to be very responsive to the user's head movement or eye movements. The system may use one or more eye tracking sensors or/and head movement tracking sensors to determine the eye position (e.g., gazing point) or/and head position of the user. Then, the system may generate and render the new subframes of scene according to the up-to-date eye position or/and head position (e.g., based on a viewpoint, a view angle, or/and a gazing point of the user). The system may use the graphic pipeline including one or more processes (e.g., tile/surface determining process by the transform block, resampling process by the pixel block, blending, filtering, correction, and sterilization processes by the display block, etc.) to generate the subframe images. Because the high rendering frame rate (and therefore the short rendering period) of the subframes, the system may have accurate and up-to-date (e.g., real-time or semi-real time) eye position information (e.g., gazing point) or/and head position information before generating next subframe of the scene. In particular embodiments, the system may take advantage of this accurate and up-to-date eye position information or/and head position information to generate foveated subframe images for foveated rendering. The system may determine a number of display regions based on their relative positions and distances to the foveal region or gazing point of the user and generate foveated subframe images with variable resolutions in different image regions corresponding to different display regions. The foveated subframe images may have high resolution (e.g., full resolution) in one or more image regions corresponding to the user's foveal region or gazing point and may have gradually lower resolutions in image regions that are farer from the user's gazing point.

Figure 3A:
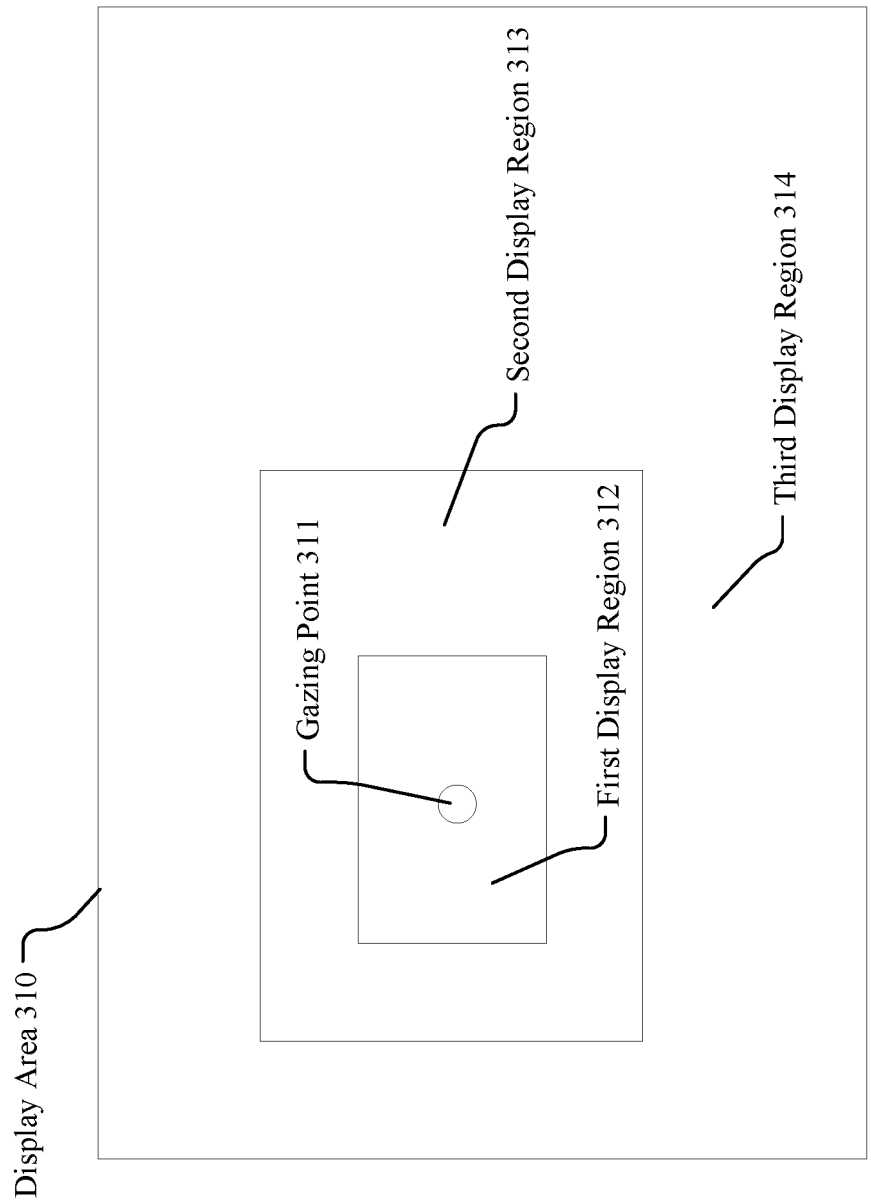
FIG. 3A illustrates an example scheme for determining display regions with different rendering resolutions for foveated rendering.

FIG. 3A illustrates an example scheme 300A for determining display regions with different rendering resolutions for foveated rendering. In particular embodiments, the system may divide the full display area 310 into different display regions or areas based on the gazing point or eye position of the user. The system may generate subframe image with different resolutions in different image regions corresponding to the display regions and render the display content with different rendering resolutions in different display regions. As an example and not by way of limitation, the system may determine a first display region 312 based on the user gazing point 311. The first display region 312 may be an rectangular region centered at the gazing point 311 covering a portion (e.g., 10%, 20%, 25%, 30%, 50%, 60%, or any suitable percentage) of the full display area. The user's gazing point may be determined based on the eye position of the user as measured by one or more eye tracking sensors. The system may determine a second display region 313 excluding the first display region 312. In other words, the second display region 313 may cover a subset of pixels which may not have shared pixels with the subset of pixels covered by the first display region 312. The system may determine a third display region 314 excluding the first display region 312 and the second display region 313 (e.g., covering a subset of pixels which may not have shared pixels with the subset of pixels covered by the first display region 312 and the second display region 313). The third display region 314 may cover the remaining areas of the display that are not covered by the first display region 312 and the second display region 313.

It is notable that the shapes and sizes of the first, second, and third display regions as described here are for example purpose and the display regions are not limited thereof. For example, the display regions could be any suitable shapes (e.g., rectangular shapes, square shapes, round shapes, polygon shapes, customized shapes, irregular shapes, arbitrary shapes, etc.) with any suitable sizes (e.g., any percentage of the full display area). As an example and not by way of limitation, the first display region 312 may have a ¼ width and a ¼ height of the full display area 310. The second display region 313 may have a ½ width and a ½ height of the full display area 310. The third display region 314 may cover the remaining area of the full display area 310 beyond the second display region 313. As another example and not by way of limitation, the first display region 312 may have a ⅛ width and a ⅛ height of the full display area 310. The second display region 313 may have a ¼ width and a ¼ height of the full display area 310. The third display region 314 may cover the remaining area of the full display area 310 beyond the second display region 313.

It is notable that the relative positions and sizes of the first, second, and third display regions are for example purpose and the display regions are not limited thereof. For example, in particular embodiments, the first display region 312 may be centered at the gazing point 311. However, in some other embodiments, the first display region 312 may not be centered at the gazing point 311. The gazing point 311 may be located at any suitable positions (e.g., a center-position, a non-center position, a position left to the center, a position right to the center, a position up to the center, a position below the center, an arbitrary position, etc.) in the first display region 311. As another example, in particular embodiments, the second display region 313 may be centered at the first display region 312 or/and centered at the gazing point 311. However, in some other embodiments, the second display region 313 may not need to be centered at the first display region 312 or centered at the gazing point 311. The first display region 312 may be located at any suitable positions in the second display region 313. The second display region 313 may be located at any suitable positions in the third display region 314.

In particular embodiments, the first display region 312 corresponding to the foveal region of the user may be determined based on degree of uncertainty of the gazing point or gazing direction of the user. For example, the system may determine the gazing direction of the user with 10 degree of uncertainty and the foveal region of the user with ±5 degrees of uncertainty. The system may determine the first display region 312 have a size corresponding to ±15 degrees of the user's view angles for the full resolution and use lower resolution in other display regions beyond the first display region. It is notable that the three display regions as described here are for example purpose and the display region division is not limited thereof. The system may divide the display into any number of regions in any suitable manners (e.g., regions divided by a grid pattern, co-centered regions, exclusive regions defined by overlapping shapes, etc.). For example, the system may divide the full display area into a number of display regions using a grid pattern and determine a rendering resolution for each of these display regions based on their relative positions or/and to the gazing point of the user. Each display region may cover a matrix of tiles (e.g., 16 tiles by 16 tiles) with each tile containing a matrix of pixels (e.g., each tile having 16 pixels by 16 pixels). The edge positions of the display regions may be constrained to some alignment (e.g., 16 pixels) to simplify the implementation. The system may generate a subframe image having different resolutions in different image regions corresponding to the display regions and render different portions of the image in different display regions of the display using corresponding rendering resolutions.

In particular embodiments, the system may render display content with different rendering resolutions in different display regions. For the display region corresponding to the foveal region (where the user's gaze is focused), the system may compute and display pixel values with full resolutions for Red, Green, and Blue color channels. For the display regions outside the foveal region, the system may use lower resolutions for one or more color channels because the user's eyes have less acuity in those regions. The system may first determine two or more display regions of the display based on the gazing point of the user and determine a rendering resolution for each of these display regions. The rendering resolutions of each display region may depend on the distance of that display region to the gazing point of the user. The system may use gradually lower rendering resolutions for display regions that are farer from the gazing point. For example, the system may use a full rendering resolution in a display region containing the gazing point of the user and use lower rendering resolutions in display regions that are farer from the user's gazing point. In particular embodiments, the system may use a graphic pipeline or one or more localized transformative operations to generate a series of foveated subframe images (e.g., at 1-2 kHz subframe frame rate). Each of the foveated subframe images may have variable image resolutions cross different image regions corresponding to the display regions of the display. The system may render the foveated subframe images using different rendering resolutions in different display regions of the display. As an example and not by way of limitation, the system may render display content of the foveated subframe image with a first resolution, a second resolution, and a third resolution in the first display region 312, the second display region 313, and the third display region 314, respectively. The first resolution may be the highest resolution (e.g., full resolution of the display) of the three rendering resolutions and the second and third resolutions may be reduced resolutions lower than the first resolution. In particular, the third resolution may be lower than the second resolution and the second resolution may be lower than the first resolution. By using the reduced rendering resolutions in one or more display regions, the system may reduce the amount of computation and power consumption related to the processes for generating and rendering the display content.

FIG. 3B illustrates three example pixel arrays (e.g., 320, 330, 340) for three color channels of Red, Green, and Blue. In particular embodiments, the system may have a display with three color channels (e.g., Red, Green, and Blue) and the system may sub-sample the pixels of one or more chromas of respective color channels. In other words, the system may allow the pixels of different color channels to have sampling resolutions which are different from other color channels. The system may use the resampling process of the graphic pipeline to determine the grayscale values of Red, Green, and Blue color channels, respectively. The grayscale values of Red, Green, and Blue color channels of a same pixel may be independently determined with respect to each other. In particular embodiments, the system may generate and render foveated images which have different sampling resolutions for the pixels of different color channels (e.g., Red, Green, Blue). Within a display region or image region, the system may allow the pixels of Red, Green, and Blue color channels to have different sampling resolutions (e.g., at powers of two to each other) when processing different parts of the screen based on distance from the foveal region of the user. As an example and not by way of limitation, within an image region corresponding to a display region, the system may allow the pixels of Green color channel to have a full sampling resolution and allow the pixels of Red and Blue color channels to have a half sampling resolution. As another example, within an image region corresponding to a display region, the system may allow the pixels of Green color channel to have a half sampling resolution and allow the pixels of Red and Green color channels to have a quarter sampling resolution. It is notable that, in this disclosure, the resolution of the images or display may be described by the number of pixels of the image or display or the number of pixels per unit area. The sampling resolution of a number of pixels (e.g., pixels in a 2D array of a color channel) may be described by a percentage of pixels whose grayscale value are independently computed or by a ratio of the independently computed grayscale values to the total number of corresponding pixels whose grayscale values are determined based on the independently computed grayscale values. The rendering resolution may refer to the resolution that is used for rendering a portion of image in a display region and the rendering resolution may correspond to the sampling resolution of the corresponding image portion that is rendered.

In particular embodiments, the system may use a full sampling resolution or a reduced sampling resolution for the pixels of one or more color channels within one or more display regions. In particular embodiments, the full sampling resolution may correspond to the full pixel resolution of the display and the reduced sampling resolution may be a sub-sampling resolution reduced from the full sampling resolution by powers of two (i.e., $\frac{1}{2^n}$ of full sampling resolution where n can be any suitable integer). For example the reduced sampling resolutions could be, ½, ¼, ⅛, 1/16, etc., of the full sampling resolution. For a sampling resolution which is $\frac{1}{2^n}$ of the full sampling resolution, the system may independently determine a grays scale value for each pixel group containing n×n pixels. It is notable that the sampling resolutions at powers of two to each other are for example purpose and the sampling resolutions are not limited thereof. The sampling resolutions of different color channels or/and different display regions may have a relationship at powers of any suitable integer number to each other.

In particular embodiments, for a 2D pixel array with a full sampling resolution, the system may independently determine (e.g., using the resampling process of the graphic pipeline) a color value or grayscale value for each pixel of the 2D pixel array. As an example and not by way of limitation, when the green pixel array 320 has a full sampling resolution, the system may independently determine a grayscale value for each of the 16 pixels within the green pixels array 320. In particular embodiments, for a 2D pixels array having a half sampling resolution, the system may independently determine (e.g., using the resampling process of the graphic pipeline) a color value or grayscale value for each 2×2 pixel sub-array (e.g., two pixels along vertical and two pixels along horizontal directions) of the 2D pixel array. The system may use a replication or interpolation process (e.g., by the display block of the display engine or by one or more controller within the display system) to determine the respective grayscale values for the pixels within each pixel sub-array. The replication or interpolation processes may be performed by the display block prior to brightness correction and dithering processes or by one or more controller of the display system. The replication and interpolation processes may need less computational resources and consume less power than the pipeline processes (e.g., tile/surface pair determining process, resampling process, filtering process, etc.). As a result, the system may reduce the computational resource usage and power consumption by independently computing only a quarter of grayscale values of the number of pixels in the 2D array. As an example and not by way of limitation, when the red pixel array 330 has a half sampling resolution, the system may independently determine a grayscale value for each of the 2×2 pixel sub-array including a first pixel sub-array including pixels of [0, 0], [0, 1], [1, 0], and [1, 1], a second pixel sub-array including pixels of [0, 2], [0, 3], [1, 2], and [1, 3], a third pixel sub-array including pixels of [2, 0], [2, 1], [3, 0], and [3, 1], and a fourth pixel sub-array including pixels of [2, 2], [2, 3], [3, 2], and [3, 3]. As a result, the system may only need to compute four independent grayscale values for the 16 pixels in the 2D pixel array.

In particular embodiments, for a 2D pixel array having a quarter sampling resolution, the system may independently determine (e.g., using the resampling process of the graphic pipeline) a color value or grayscale value of each 4×4 pixel sub-array (e.g., four pixels along vertical direction and four pixels along horizontal direction) of the 2D pixel array. The system may use a replication or interpolation process (e.g., by the display block of the display engine or by one or more controller within the display system) to determine the respective grayscale values for the pixels within each pixel sub-array. As a result, the system may need to compute only 1/16 of grayscale values of the number of pixels in a 2D array. As an example and not by way of limitation, when the blue pixel array 340 has a quarter sampling resolution, the system may independently determine a grayscale value for the 4×4 pixel group including all 16 pixels in the blue pixel array 340. The grayscale values of the 16 pixels may be determined by replicating the same grayscale value or interpolating multiple grayscale values that are independently determined. As a result, the system may only need to independently compute one grayscale value for the 16 pixels in the 2D array. It is notable that the half and quarter sampling resolutions are for example purpose and the reduced sampling resolutions are not limited thereof. The reduced sampling resolutions of different color channels or/and different display regions may have a relationship to the full sampling resolution and to each other at powers of any suitable integer number (i.e., $1/m^n$ of the full sampling resolution, where m and n can be any suitable integer).

In particular embodiments, the system may use a display (e.g., µLED display) which has different pixel size for different color channels. For example, the system may use a µLED display which has red pixels and blue pixels being twice as large (four times the area) as the green pixels. The number of red, green, and blue pixels in a display region may have a ratio of 1:4:1 with each red pixel and each blue pixel corresponding to four green pixels. In particular embodiments, the system may use a display having the same size of pixels for three color channels and the same number of pixels for each color channel (e.g., the ratio of red, green, and blue pixels being 1:1:1 in a display region). In particular embodiments, the system may use a display having the same size of pixels for three color channels but different number of pixels for different color channels (e.g., the number ratio of red, green, and blue pixels being 1:2:1 in a display region). It is notable that the systems and methods as described in this disclosure are not dependent on the type of display and are applicable to any types of displays including, for example, but not limited to, μLED displays, OLED displays, AMLED displays, LCD displays, LED displays, or any suitable displays with any pixel sizes or/and any ratio of the number pixels of different color channels. It is notable that the systems and methods as described in this disclosure are not limited to display with RGB color channels. For example, in particular embodiments, the system may have a display with black and white luminance channels and two other channels for color information taking advantage that human perceives color less precisely than luminance. One or more color channels or luminance channels may be subsampled in the horizontal or/and vertical direction. The systems and method as described in this disclosure are also applicable to this type of displays.

FIG. 3C illustrates an example scheme 300C for determining sampling resolutions of different color channels and different display regions. In particular embodiments, the system may determine a number of display regions and a number of gradually lower rendering resolutions for these regions based on their relative positions or/and distances to the gazing point of the user. As discussed in earlier sections of this disclosure, the system may allow different color channels to have different sampling resolutions. The sampling resolutions of different color channels could be independent or related (e.g., at powers of two) to each other. In particular embodiments, the system may have a display with red and blue pixels having a larger size than green pixel (e.g., twice in size and fourth times in area). The number of red, green, and blue pixels in a display region may have a ratio of 1:4:1 with each red pixel and each blue pixel corresponding to four green pixels. In particular embodiments, the system may have a display which may have red, green, and blue pixels of the same size but have more green pixels than red or blue pixels (e.g., the number ratio of the RGB pixels could be 1:2:1). The green pixels of the display may illuminate a larger percentage of light density (e.g., 70-80%) than red or blue pixels. In particular embodiments, the system may have a display which may have red, green, and blue pixels of the same size and have the same number of green, red or blue pixels (e.g., the number ratio of the RGB pixels could be 1:1:1). In particular embodiments, the system may use a relative higher sampling resolution for Green color channel than Red and Blue color channels. However, it is notable that the systems and methods as described in this disclosure are applicable to any types of display with any pixel size and any number of pixels of different color channels.

As an example and not by way of limitation, the system may determine a first display region corresponding to (e.g., centered at or containing) the gazing point of the user and determine the second, third, and fourth display regions with each having a longer distance to the gazing point. For the first display region corresponding to the foveal region where the gaze of the user is focused, the system may use a full sampling resolution and compute an independent grayscale value for each pixel of each color channel. The full sampling resolution in the first display region may allow the displayed content in this region to have sharp edges and enable a clear view of the display content in this region. For other display regions, the system may use reduced sampling resolutions since the user may not have as much acuity in these regions.

As another example, for the second display region, the system may use a full sampling resolution for Green color channel and use a half sampling resolution for both Red and Blue color channels. As a result, for all the pixels of the three color channels of this display region, the system may only need to independently compute grayscale values for half of the total number of the pixels in this region (with a corresponding computation reduction rate of ½). For example, referring to the pixel arrays of 320, 330, and 340 in FIG. 3B, when Green color channel has a full sampling resolution and Red and Blue color channels have half a sampling resolution, the number of grayscale values that need to be independently computed may be 16, 4, and 4 for the color channels of Green, Red, and Blue, respectively, with a total number of 24 independent grayscale values, which is ½ of all 48 pixels of the three pixel arrays 320, 330, and 340 in total.

As yet another example, for the third display region, the system may use a half sampling resolution for all three color channels of Green, Red, and Blue. As a result, for all the pixels in all three color channels in this region, the system may only need to independently compute grayscale values for ¼ of the total number of pixels of this region (with a corresponding computation reduction rate of ¼). For example, referring to the pixel arrays of 320, 330, and 340 in FIG. 3B, when all three color channels have a half sampling resolution, the number of grayscale values that need to be independently computed could be 4, 4, and 4 for the color channels of Green, Red, and Blue, respectively. The total number of independent grayscale values could be 12, which is ¼ of all 48 pixels in the three pixel arrays 320, 330, and 340.

As yet another example, for the fourth display region, the system may use a half sampling resolution for Green color channel and may use a quarter sampling resolution for the color channels of Red and Blue. As a result, for all the pixels in all three color channels of this region, the system may only need to independently compute grayscale values for ⅛ of the total number of pixels in this region (with a corresponding computation reduction rate of ⅛). For example, referring to the pixel arrays of 320, 330, and 340 in FIG. 3B, when the Green color channel has a half sampling resolution and Blue and Red color channels have a quarter sampling resolution, the number of grayscale values that need to be independently computed could be 4, 1, and 1 for the color channels of Green, Red, and Blue, respectively. The total number of independent grayscale values could be 6, which is ⅛ of all 48 pixels in the three pixel arrays 320, 330, and 340. As a result, the system may reduce the amount of computation for generating the image regions with reduced sampling resolutions. It is notable that the sampling resolution scheme as described here is for example purpose and the sampling resolution determination is not limited thereof. For example, the system may use any suitable combinations of any sampling resolutions for the three color channels. It is notable that the relationship of different sampling resolutions of different color channels is not limited to the relationship of powers of two to each other. It could be at powers of any suitable integer number.

In particular embodiments, the system may determine a number of display regions of particular sizes for rendering display content with different rendering resolutions. As an example and not by way of limitation, referring to FIG. 3A, the system may determine a first display region 312 which is a quarter of the full display size 310 (¼ width and ¼ height of the full display) and covers ¹⁄₁₆ of the full display area. The system may determine a second display region 313 excluding the first display region 312. The second display region may correspond to a rectangular shape (excluding the first display region 312) which is half of the full display size (½ of width and ½ height of the full display covering ¼ of the full display area). The system may determine a third display region 314 including the remaining area of the full display area and covering ¾ of the full display area. In particular embodiments, the full display area may have a resolution of 2560 pixels by 1792 pixels. The first display region 312 may be approximately centered at the gazing point 311 of the user (e.g., the center of the first display region being within a threshold distance to the gazing point 311 of the user). The edge positions of the display regions may be constrained to some alignment (e.g., 16 pixels) to simplify the implementation.

FIG. 3D illustrates an example scheme 300D using different sampling resolutions for different color channels and different display regions to reduce the amount of computation. In particular embodiments, the first display region may have the all three color channels having the full sampling resolution. The system may independently compute a grayscale value for each pixel of each color channel in this display region. The second display region may use a full sampling resolution for Green color channel and use a half sampling resolution for Red and Blue color channels. As described in earlier sections of this disclosure, the system may only need to independently compute grayscale values for ½ of the total number of the pixels in this region (with a computation reduction rate of ½). Because the second display region covers 3/16 of the full display area, the system may only need to independently compute grayscale values for 3/32 of the total pixels of the display for the second display region (e.g., a computation reduction from 3/16 to 3/32 of the total pixels of the display as contributed by the second display region). The third display region may use a half sampling resolution for all three color channels. As described in earlier sections of this disclosure, the system may only need to independently compute grayscale values for ¼ of the total number of the pixels in this region (with a computation reduction rate of ¼). Because the third display region covers ¾ of the full display area, the system may only need to independently compute grayscale values for 3/16 of the total pixels of the display for the second display region (e.g., a computation reduction from ¾ to 3/16 of the total pixels of the display as contributed by the third display region). As a result, the system may have a computation reduction rate of 11/32 (i.e., 1/16+3/32+3/16) or approximately 3:1 reduction for the computation reduction to pixel processing by using this example scheme. Consequently, the system may only need approximately ⅓ of the bus bandwidth for transmitting the display data to the display backplane.

In particular embodiments, the system may further reduce the computation for determining pixels values by using a smaller region for the first display regions (which may have relatively higher sampling resolutions such as full sampling resolution) or/and by using further lower sampling resolutions in other display regions. As an example and not by way of limitation, the system may use a first display region with ⅕ width and ⅕ height of the full display size (i.e., 1/25 area of the full display area). As another example, the system may use a first display region with ⅙ width and ⅙ height of the full display size (i.e., 1/36 area of the full display area). As another example, the system may use a first display region with ⅛ width and ⅛ height of the full display size (i.e., 1/64 area of the full display area). It is notable that the sizes of the first display region as described here are for example purpose and the size first display region is not limited thereof and can be any suitable sizes.

In particular embodiments, the system may further reduce the amount of computation for determining pixel values by using further lower sampling resolutions in one or more display regions. As an example and not by way of limitation, in the third display region, the system may use a half resolution for Green color channel and use a quarter resolution for Red and Blue color channels. For the third display region, the system may need to independently compute grayscale values only for 3/32 (i.e., ⅛×¾) of the total pixels of the display. With other regions having the same sizes and sampling resolution as shown in FIG. 3D, the system may have a total computation reduction rate of 7/32 (i.e., 1/16+3/32+3/32=7/32) or approximately ¼ for all the pixels of the display.

In particular embodiments, the system may reduce the worst-case scanline bandwidth (or peak bandwidth per row) on the data bus by using the foveated rendering with reduced rendering resolutions in one or more display regions. For example, for display regions as illustrated in FIG. 3A using the scheme shown in FIG. 3D, the first display region may have all three color channels with full sampling resolutions and therefore have full pixel density. The second display region may have full sampling resolution for Green color channels and half sampling resolution for Red and Blue color channels, and therefore have ½ pixel density. The third display region may have half sampling resolution for all three color channels, and therefore have ¼ pixel density. Any row that intersects with the first display region may have ¼ pixels of that row falling in the first display region with full pixel density, ¼ pixels of that row falling in the second display region with ½ pixel density, and ½ pixels of that row falling in the third display region with ¼ pixel density. As a result, the worst-case scanline bandwidth for the row intersecting with all three display regions may have a reduction ratio of ½ (or 2:1 compression rate) as determined by ½=¼×1+½×¼+¼×½ (i.e., sum of pixels density×pixel number percentage of the row) comparing with full resolution rendering for the whole display. Consequently, the peak bandwidth per row on the data bus may be the same reduction ratio of 2:1 for this example.

In particular embodiments, the system may generate a series of foveated subframe images with variable resolutions in different image regions for foveated rendering. Comparing to generating full resolution subframe images, generating foveated subframe images may use less computational resources and consume less power. For example, for the image regions with lower resolutions, the system may cast less rays during the tile/surface pair determining process by the transform block, and therefore reduce the power consumption and computational resource usage. As another example, for the image regions with lower resolutions, the graphic pipeline may compute for a smaller number of pixels during the resampling process by the pixel block, and therefore reduce the power consumption and computational resource usage. As another example, for the foveated subframe images, the system may process larger display area (e.g., a larger number of pixels or pixel tiles) during the blending, correction, sterilization processes by the display block, and therefore reduce the power consumption and computational resource usage. As another example, for generating image regions with reduced sampling resolutions, the system may access source data with lower resolutions (e.g., MIP map texture data with lower resolutions or larger sizes) and, therefore perform less memory reading for accessing texture data. Furthermore, by using the foveated subframe images, the system may need less data transformation bandwidth for transmitting the pixel values to the display through the data bus (which may have limited bandwidth).

FIGS. 4A-4D illustrate an example framework allowing the system to process a larger number of pixel tiles using the same computational resources by reducing sampling resolutions in one or more image regions. As an example and not by way of limitation, the system may need to process the pixels in a tile array 400A including 4×4 pixel tiles (e.g., tile 411, tile 412, tile 413, tile 414, tile 421, tile 422, tile 423, tile 424, tile 431, tile 432, tile 433, tile 434, tile 441, tile 442, tile 443, tile 444). Each tile may include an array of pixels of any suitable sizes (i.e., n×n pixel array where n could be any integer number), for example, a 4×4 pixel array, a 16×16 pixel array, 64×64 pixel array, etc. In particular embodiments, each pixel tile may correspond to one single pixel including three sub-chroma pixels of the Red, Green, and Blue color channels. For this example, the sub-chroma pixels of the Red, Green, and Blue color channels may have a number of ratio of 1:1:1 or/and the same pixel size and each tile (e.g., tile 411, tile 412, tile 421, tile 422) may include a 16×16 pixel array (e.g., a combination of the three pixel arrays 320, 330, 340 of the three color channels as illustrated in FIG. 3B).

Figures 4A, 4B:
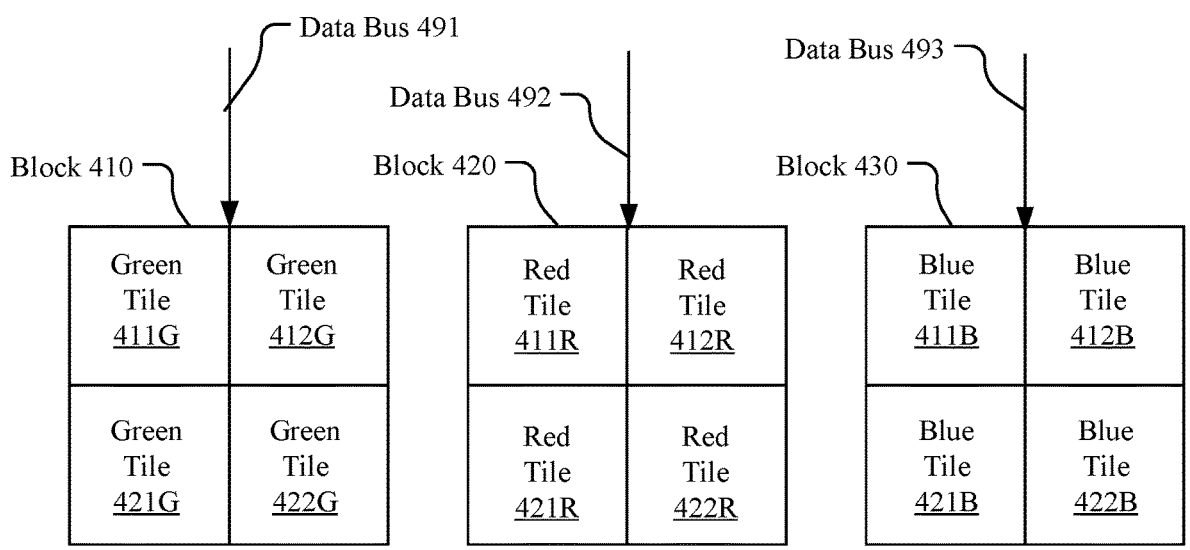
FIGS. 4A-4D illustrate an example framework allowing the system to process a larger number of pixel tiles using the same computational resources by reducing sampling resolutions in one or more image regions.

In particular embodiments, for generating full resolution image regions (e.g., for the region corresponding to the user's foveal region or gazing point), the system may use a group of computational resources (e.g., memories, buffers, caches, computational units, filters, data bus with certain bandwidth, or any image processing resources) as represented by the blocks 410, 420, and 430 of the scheme 400B of FIG. 4B to process the pixel tile in the pixel tile array 400A. In particular embodiments, each block may be dedicated to the pixel tiles of a color channel and process four pixel tile (of that color channel) simultaneously. For example, the block 410 may be dedicated to Green color channels and simultaneously process four green tiles of 411G, 412G, 421G, and 422G. Similarly, the block 420 may be dedicated to Red color channel and simultaneously process four red tiles of 411R, 412R, 421R, and 422R. The block 430 may be dedicated to Blue color channel and simultaneously process four blue tiles of 4111B, 412B, 421B, and 422B. As a result, the group of computation resources as represented by the three blocks of 410, 420, and 430 may simultaneously process four pixel tiles covering a portion of the image (e.g., in the image area 401 in FIG. 4A). Correspondingly, the system may access memory through the respective data buses (e.g., data bus 491, 492, and 493) to retrieve the amount of data with particular bandwidth as determined by the simultaneously processed pixel tiles on each block.

Figures 4C, 4D:
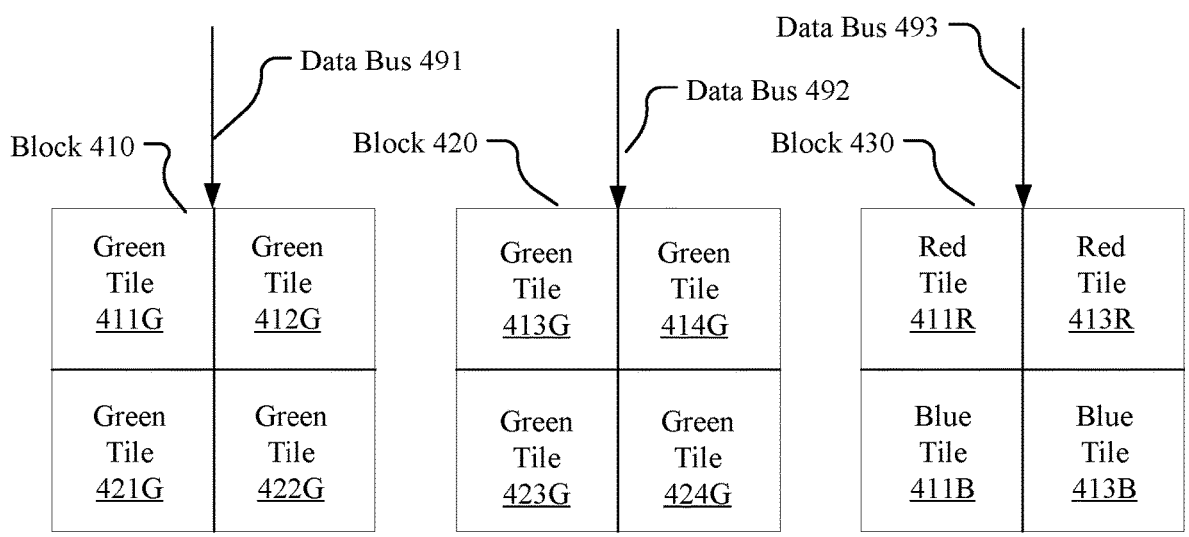

In particular embodiments, for generating resolution image regions with reduced sampling resolutions (e.g., for the regions beyond the user's foveal region), the system may use the same group of computational resources (e.g., memories, buffers, caches, computational units, filters, data bus with certain bandwidth, or any image processing resources) as represented by the block 410, block 420, and block 430 to simultaneously process a larger image area. For example, for an image region with a full sampling resolution for Green color channel and half sampling resolution for Red and Blue color channels, the system may need to independently compute a grayscale value for each pixel of Red or Blue color channel for every four pixels of Green color channel. In other words, the sub-chroma pixel of Red, Green, and Blue color channels may have a number ratio of 1:4:1. The system may optimize the usage of the resources for processing the pixel tiles as illustrated in FIG. 4D. For example, the block 410 and 420 may be dedicated to Green color channels and simultaneously process eight green tiles of 411G, 412G, 413G, 414G, 421G, 422G, 423G, and 424G. The block 430 may be used to process the Red and Green color channels and simultaneously process two green tiles of 411R and 413R and two red tiles of 411R and 413R. As a result, the group of computation resources as represented by the three blocks of 410, 420, and 430 of the scheme 400D in FIG. 4D may simultaneously process an image area 402 (in the tile array 400C in FIG. 4C) which is twice large of the image area 401 on the tile array 400A as shown in FIG. 4A. Correspondingly, for generating or processing the image area of the same size, the system may need less bandwidth from respective data buses (e.g., data bus 491, 492, and 493) and retrieve less amount of data during the image generating or processing processes. Therefore, the system may process a larger image area (e.g., a larger number of pixel or pixel tiles) in a given clock cycle using the same amount the computational resources as for processing full resolution image because of the reduced memory reading and data processing, and therefore improve the efficiency of the system performance.

It is notable than the framework as illustrated in FIGS. 4A-4D is not limited to any specific computational resources. For example, the blocks 410, 420, and 430 may represent computation units, memories, filters, buffers, caches, data bus bandwidth, or any suitable resources. As another example, the arrangement of the pixel tiles and the corresponding processing blocks may be an arbitrary arrangement allow the same block size to host or/and process more pixel tiles (e.g., twice as many pixels before sub-sampling). By using the foveated rendering with reduced resolutions in one or more image regions, the system may process a larger image area using the same amount computational resources, and therefore consume less power and time for the image rendering processes. Furthermore, the generating or processing image regions with reduced sampling resolutions, the system may use lower resolution texture data and have less texture memory reading operations, and therefore further reduce the power consumption. For example, considering a region with full resolution for Green color channel and half-resolution for Red and Blue, the system may access full resolution source data for green and compute a separate value for each pixel, which would be sent to the display backplane. However, for red and blue, the system may access one quarter resolution source data and compute one value for each 2×2 of pixels. These values would each be sent to the display backplane, which may replicate them into 2×2 display pixels. As a result, this method reduces not only the memory storage, memory access and processing time required for the lower resolution sub-chroma pixels, but also reduces the bandwidth on the data bus from the display block to the backplane that drives the display.

FIGS. 5A-5C illustrate an example replication process and interpolation process for determining grayscale values for the pixels within a pixel sub-array. FIG. 5A illustrates an example pixel array having half sampling resolution. The system may independently compute a grayscale value for each 2×2 pixel sub-array in the pixel array 510, as shown in FIG. 5A, where the solid dots represent pixels that have independently computed grayscale values and the empty dots represent the pixels whose grayscale values are not independently computed (and will be determined by the replication or interpolation process). For example, the system may independently compute the grayscale values for pixels [0, 0], [0, 2], [2, 0], and [2, 2] for the respective 2×2 pixel sub-arrays. Then, the system may use a replication process or an interpolation process to determine the pixels value for each pixel within the respective 2×2 pixel sub-arrays. FIG. 5B illustrates an example replication process for determining grayscale values for all pixels within the sub-array 511. The system may replicate grayscale value of the pixel [0, 0] and use the same values for the pixels [0, 1], [1, 0], and [1, 1]. FIG. 5C illustrates an example interpolation process for determining grayscale values for all pixels within the sub-array 515. For example, the system may determine the grayscale values of the pixels [1, 0], [0, 1], [1, 2] and [2, 1] by interpolating the grayscale values of the pixel pairs of [0, 0] and [2, 0], [0, 0] and [0, 2], [0, 2] and [2, 2], and [2, 0] and [2, 2], respectively. As another example, the system may determine the grayscale value for the pixel [1, 1] by interpolating any suitable combination of pixels [0, 0], [0, 2], [2, 0], and [2, 2]. It is notable that the pixels in the pixel array 510 could be pixels of any color channels. It is notable that the replication process and interpolation process as illustrated here are for example purpose and the replication process and interpolation process are not limited thereof. For example, the replication process may used to determine grayscale values for the pixels of any sub-arrays with any sizes. As another example, the interpolation process may be based on any number of related pixels (not limited to two pixels). As another example, the interpolation process may be based on a weighted averaging computation to preserve the average brightness of one or more portion of the images. As a result, the system may selectively determine and render the duplicated regions of the image based on grayscale values from the foveating perspective and reduce the amount of computation related to the rendering process.

In particular embodiments, the replication process or/and interpolation process may be performed by the display block of the display engine before the brightness correction and dithering processes. In particular embodiments, the replication process or/and interpolation process may be performed by the display system (e.g., by one or more controllers of the display) after the pixel data being transmitted to the display. For example, the system may send the pixel values with reduced sampling resolutions to the display system (which need less data bus bandwidth for transmitting) and sending the location information (e.g., the sub-arrays or pixel locations that the respective physical pixels are associated with) for mapping the corresponding pixel values to the display (or mapping the pixel density per tile being transmitted to physical pixel arrays) in the same or a separate data stream (e.g., a side channel) to the pixel value data. The system may include a display system (e.g., an LED display or pLEd display) which may include driver logics or controllers for performing the replication and interpolation operations. By using the replication process or/and duplication process, the system may extend the computation resource saving and power saving due to the foveated rendering to the downstream rendering pipeline.

In particular embodiments, the system may preserve the contrast or/and average brightness in one or more portions of the foveated image. In particular embodiments, the system may pre-process the source data (e.g., MIP map texture data) and access the source data at successively lower resolutions for generating the foveated image to preserve the contrast or/and average brightness. In particular embodiments, the system may apply a sharpness filter to the computed pixel values prior to preserve the contrast or/and average brightness before sending the pixel values to the display backplane. In this case, the pixels with a full sampling resolution may not need to be filtered and only the pixels with reduced sampling resolutions may need to be filtered. For example, for the display region as shown in FIG. 3A and the sampling resolution scheme as shown in FIG. 3D, the pixels in the first display region and the pixels of the Green color channel of the second display region may not need to be filtered since they have a full sampling resolution. The pixels of the Red and Blue color channels of the second display and all pixels of the third display region may need to be filtered to preserve the contrast and the average brightness of the corresponding pixels.

Figure 6:
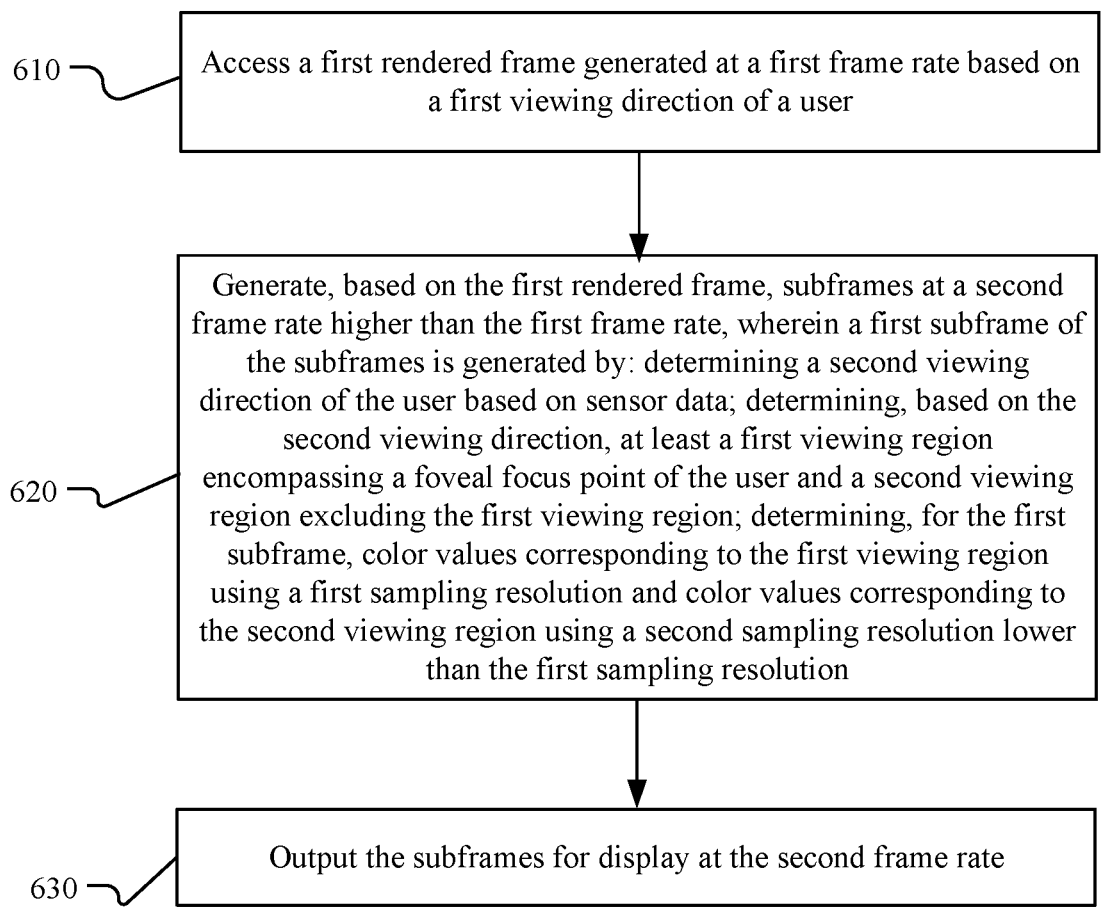
FIG. 6 illustrates an example method for foveated rendering.

FIG. 6 illustrates an example method 600 for foveated rendering. The method 600 may begin at step 610, where the computing system may access a first rendered frame (e.g., a mainframe image) generated at a first frame rate (e.g., a mainframe rate of 30-90 Hz). At step 620, the system may generate, based on the first rendered frame, subframes at a second frame rate higher than the first frame rate. A first subframe of the subframes may be generated by: determining a viewing direction of the user based on sensor data; determining, based on the viewing direction, at least a first viewing region encompassing a foveal focus point (e.g., the gazing point) of the user and a second viewing region excluding the first viewing region; determining, for the first subframe, color values corresponding to the first viewing region using a first sampling resolution and color values corresponding to the second viewing region using a second sampling resolution lower than the first sampling resolution. At step 630, the system may output the subframes for display at the second frame rate.

In particular embodiments, the system may generate the first subframe using a graphic pipeline including at least a transform block and a pixel block. The system may use the transform block to determine a number of tile-surface pairs by casting a number of rays to a number of surfaces for determining intersections between the tiles and the surface. The system may use the pixel block to determine the color values corresponding to the first and second viewing regions based on the plurality of tile-surface pairs. In particular embodiments, the transform block may cast fewer rays for determining the color values corresponding to the second viewing region (associated with the second sampling resolution) than the color values corresponding to the first viewing region (associated with the first sampling resolution). In particular embodiments, the system may determine, by the pixel block, the color values corresponding to the first viewing region by sampling a first set of surfaces using the first sampling resolution. The system may determine, by the pixel block, the color values corresponding to the second viewing region by sampling a second set of surfaces using the second sampling resolution. The pixel block may perform a smaller amount of computation for determining the color values corresponding to the second viewing region than the color values corresponding to the first viewing region.

In particular embodiments, a first color channel of a group of pixels corresponding to the second viewing region may be associated with the second sampling resolution. A second color channel of the group of pixels corresponding to the second viewing region may be associated with a third sampling resolution different from the second sampling resolution. In particular embodiments, the system may independently determine a grayscale value for each n×n pixel array of the first color channel of the group of pixels corresponding to the second viewing region, where the value of n may be determined based on the second sampling resolution. In particular embodiments, the system may independently determine a grayscale value for each m×m pixels of a second color channel of the group of pixels corresponding to the second viewing region, where the value of m may be determined based on the third resolution associated with the second color channel. In particular embodiments, the second sampling resolution of the first color channel and the third sampling resolution of the second color channel may have a relationship of powers of two. In particular embodiments, the system may determine a grayscale value for each pixel within the n×n pixel array based on a replication process which may be performed by a display system. In particular embodiments, the system may determine a grayscale value for each pixel within the n×n pixel array based on an interpolation process performed by a display block of the graphic pipeline prior to a brightness correction process and a dithering process.

In particular embodiments, the system may determine a third viewing region excluding the first viewing region and the second viewing region. The respective color values of the first viewing region, the second viewing region, and the third viewing region may be determined based on a gradually lower sampling resolution. In particular embodiments, the system may generate the first subframe based on a source data. The system may pre-process the source data at a successively lower resolution for generating the first subframe and access the source data at the successively lower resolution while generating the first subframe. In particular embodiments, the system may apply a sharpness filter to a number of pixels corresponding to the second viewing region to preserve a contrast level on one or more edges associated with one or more objects in the second viewing region. In particular embodiments, the system may apply a sharpness filter to a number of pixels of the first subframe in the second viewing region to preserve an average brightness in the second viewing region. In particular embodiments, the first frame rate may be within a first range of 30-90 Hz and the second frame rate may be within a second range of 1-2 kHz.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for foveated rendering including the particular steps of the method of FIG. 6, this disclosure contemplates any suitable method for foveated rendering including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
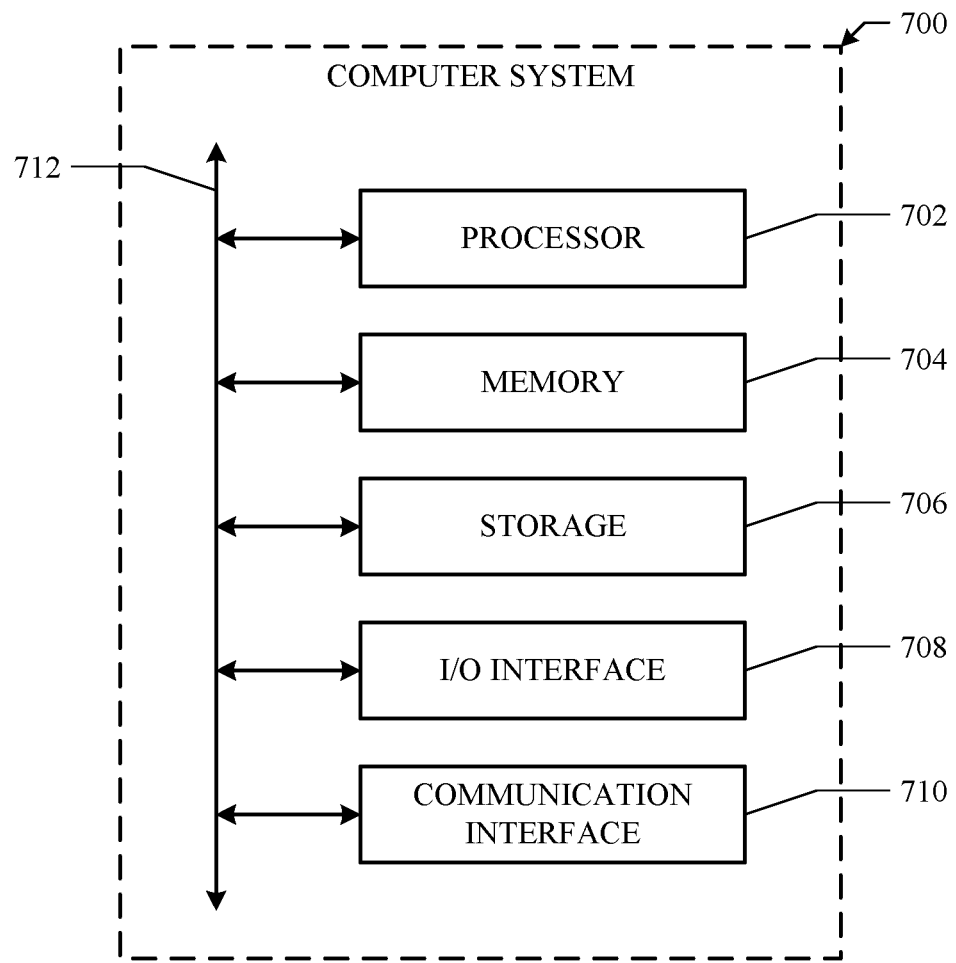
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a focus point of a viewer based on sensor data received by the computing system;
   determining, for a current frame, a first viewing region encompassing the focus point of the viewer and a second viewing region excluding the first viewing region;
   determining, for the current frame, color values for the first viewing region using respective first sampling resolutions for a plurality of color channels, and color values for the second viewing region using respective second sampling resolutions for the plurality of color channels, wherein at least one second sampling resolution is lower than a corresponding first sampling resolution associated with a same color channel, and wherein at least two of the second sampling resolutions for the plurality of color channels of the second viewing region are different from each other, wherein a first color value associated with a first color channel of the second viewing region is shared in an n×n pixel array in the second viewing region, and wherein the value of n is determined based on a second sampling resolution associated with the first color channel of the n×n pixel array in the second viewing region; and
   outputting the color values for the first viewing region and the second viewing region of the current frame for display.

2. The method of claim 1, wherein the color values corresponding to the first and second viewing regions are determined based on a plurality of tile-surface pairs, and wherein the plurality of tile-surface pairs are determined by:
   casting a plurality of rays to a plurality of surfaces for generating the current frame;
   determining intersections of the plurality of rays and the plurality of surfaces; and
   determining the plurality of tile-surface pairs based on the intersections of the plurality of rays and the plurality of surfaces.

3. The method of claim 2, wherein the color values corresponding to the second viewing region are determined using a smaller amount of computation than the color values corresponding to the first viewing region.

4. The method of claim 2, wherein the color values corresponding to the second viewing region are determined based on a smaller number of casted rays than the color values corresponding to the first viewing region.

5. The method of claim 1, wherein color values of the first color channel of the first viewing region and color values of the first color channel of the second viewing region are determined using a same sampling resolution.

6. The method of claim 1, wherein color values of a second color channel of the first viewing region and color values of the second color channel of the second viewing region are determined using two sampling resolutions different from each other, and wherein the two sampling resolutions have a relationship of powers of two.

7. The method of claim 1, further comprising:
   determining a color value for each pixel within the n×n pixel array based on a replication process performed by a second computing system on a display.

8. The method of claim 1, further comprising:
   determining a color value for each pixel within the n×n pixel array by interpolating color values associated with the n×n pixel array and one or more adjacent n×n pixel arrays.

9. The method of claim 1, further comprising:
   determining a third viewing region surrounding the second viewing region, wherein color values of the plurality of color channels corresponding to the third viewing region are determined using a same third sampling resolution.

10. The method of claim 1, further comprising, prior to determining the color values of the first viewing region and the second viewing region:
    pre-processing a source data with successively lower sampling resolutions for generating the current frame; and accessing the source data with the successively lower sampling resolutions while generating the current frame.

11. The method of claim 1, further comprising:
applying a sharpness filter to a plurality of pixels of the current frame in the second viewing region, wherein the current frame preserves a contrast level on one or more edges associated with one or more objects in the second viewing region.

12. The method of claim 1, further comprising:
applying a sharpness filter to a plurality of pixels of the current frame in the second viewing region, wherein the current frame preserves an average brightness in the second viewing region.

13. The method of claim 1, wherein the plurality of color channels comprise a red color channel, a blue color channel, and a green color channel, wherein the red color channel and the blue color channel of the second viewing region have a same sampling resolution, and wherein the green color channel has a higher sampling resolution than the red color channel and the blue color channel.

14. One or more computer-readable non-transitory storage media embodying software that is operable when executed to:
determine a focus point of a viewer based on sensor data received by a computing system;
determine, for a current frame, a first viewing region encompassing the focus point of the viewer and a second viewing region excluding the first viewing region;
determine, for the current frame, color values for the first viewing region using respective first sampling resolutions for a plurality of color channels, and color values for the second viewing region using respective second sampling resolutions for the plurality of color channels, wherein at least one second sampling resolution is lower than a corresponding first sampling resolution associated with a same color channel, and wherein at least two of the second sampling resolutions for the plurality of color channels of the second viewing region are different from each other, wherein a first color value associated with a first color channel of the second viewing region is shared in an n×n pixel array in the second viewing region, and wherein the value of n is determined based on a second sampling resolution associated with the first color channel of the n×n pixel array in the second viewing region; and
output the color values for the first viewing region and the second viewing region of the current frame for display.

15. The media of claim 14, wherein the color values corresponding to the first and second viewing regions are determined based on a plurality of tile-surface pairs, and wherein the plurality of tile-surface pairs are determined by:
casting a plurality of rays to a plurality of surfaces for generating the current frame;
determining intersections of the plurality of rays and the plurality of surfaces; and
determining the plurality of tile-surface pairs based on the intersections of the plurality of rays and the plurality of surfaces.

16. The media of claim 15, wherein the color values corresponding to the second viewing region are determined using a smaller amount of computation than the color values corresponding to the first viewing region.

17. A computing system comprising:
one or more processors, and
one or more computer-readable non-transitory storage media coupled to one or more of the processors and comprising instructions operable when executed by one or more of the processors to cause the system to:
determine a focus point of a viewer based on sensor data received by the computing system;
determine, for a current frame, a first viewing region encompassing the focus point of the viewer and a second viewing region excluding the first viewing region;
determine, for the current frame, color values for the first viewing region using respective first sampling resolutions for a plurality of color channels, and color values for the second viewing region using respective second sampling resolutions for the plurality of color channels, wherein at least one second sampling resolution is lower than a corresponding first sampling resolution associated with a same color channel, and wherein at least two of the second sampling resolutions for the plurality of color channels of the second viewing region are different from each other, wherein a first color value associated with a first color channel of the second viewing region is shared in an n×n pixel array in the second viewing region, and wherein the value of n is determined based on a second sampling resolution associated with the first color channel of the n×n pixel array in the second viewing region; and
output the color values for the first viewing region and the second viewing region of the current frame for display.

18. The system of claim 17, wherein the color values corresponding to the first and second viewing regions are determined based on a plurality of tile-surface pairs, and wherein the plurality of tile-surface pairs are determined by:
casting a plurality of rays to a plurality of surfaces for generating the current frame;
determining intersections of the plurality of rays and the plurality of surfaces; and
determining the plurality of tile-surface pairs based on the intersections of the plurality of rays and the plurality of surfaces.

19. The system of claim 18, wherein the color values corresponding to the second viewing region are determined using a smaller amount of computation than the color values corresponding to the first viewing region.

* * * * *